US011410696B2

(12) United States Patent
Kasada

(10) Patent No.: US 11,410,696 B2
(45) Date of Patent: *Aug. 9, 2022

(54) MAGNETIC RECORDING MEDIUM, MAGNETIC RECORDING AND REPRODUCING APPARATUS, MAGNETIC TAPE CARTRIDGE, AND MAGNETIC TAPE CARTRIDGE GROUP

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/154,002

(22) Filed: Jan. 21, 2021

(65) Prior Publication Data
US 2021/0233562 A1 Jul. 29, 2021

(30) Foreign Application Priority Data

Jan. 24, 2020 (JP) .............................. JP2020-010313

(51) Int. Cl.
| G11B 5/706 | (2006.01) |
| G11B 5/008 | (2006.01) |
| G11B 5/735 | (2006.01) |
| G11B 5/714 | (2006.01) |

(52) U.S. Cl.
CPC ...... G11B 5/70678 (2013.01); G11B 5/00817 (2013.01); G11B 5/714 (2013.01); G11B 5/7356 (2019.05)

(58) Field of Classification Search
CPC . G11B 5/00817; G11B 5/70678; G11B 5/714; G11B 5/7356; G11B 5/7085; G11B 5/733
See application file for complete search history.

(56) References Cited

U.S. PATENT DOCUMENTS

| 5,490,020 A | 2/1996 | Albrecht et al. |
| 5,906,885 A | 5/1999 | Yoshimura et al. |
| 10,665,259 B1 | 5/2020 | Yamaga et al. |

(Continued)

FOREIGN PATENT DOCUMENTS

| JP | 2005-092967 A | 4/2005 |
| JP | 2008-140504 A | 6/2008 |

(Continued)

OTHER PUBLICATIONS

Notice of Allowance dated Jul. 27, 2021 in U.S. Appl. No. 17/155,777.

(Continued)

*Primary Examiner* — Holly Rickman
*Assistant Examiner* — Linda N Chau
(74) *Attorney, Agent, or Firm* — Sughrue Mion, PLLC

(57) ABSTRACT

In the magnetic recording medium, a number distribution A of a plurality of bright regions, based on equivalent circle diameters thereof, in a binarized image of a secondary electron image obtained by imaging a surface of the magnetic layer by a scanning electron microscope at an acceleration voltage of 5 kV and a number distribution B of a plurality of dark regions, based on equivalent circle diameters thereof, in a binarized image of a secondary electron image obtained by imaging a surface of the magnetic layer by a scanning electron microscope at an acceleration voltage of 2 kV respectively satisfy a predetermined number distribution.

15 Claims, 6 Drawing Sheets

(56) References Cited

U.S. PATENT DOCUMENTS

| | | |
|---|---|---|
| 2007/0009768 A1 | 1/2007 | Takeda et al. |
| 2007/0254190 A1 | 11/2007 | Brodd et al. |
| 2008/0241600 A1 | 10/2008 | Tanaka et al. |
| 2010/0143751 A1 | 6/2010 | Hsieh et al. |
| 2011/0273797 A1 | 11/2011 | Biskeborn et al. |
| 2015/0380037 A1 | 12/2015 | Tamada et al. |
| 2017/0092314 A1 | 3/2017 | Mori |
| 2018/0114541 A1 | 4/2018 | Nakashio et al. |
| 2018/0182422 A1 | 6/2018 | Kawakami et al. |
| 2018/0182428 A1 | 6/2018 | Kasada et al. |
| 2018/0286449 A1 | 10/2018 | Kasada et al. |
| 2020/0118589 A1 | 4/2020 | Terakawa et al. |
| 2021/0233561 A1 | 7/2021 | Kasada |
| 2021/0233563 A1 | 7/2021 | Musha et al. |
| 2021/0233564 A1 | 7/2021 | Kasada |
| 2021/0233565 A1 | 7/2021 | Kasada et al. |
| 2021/0233566 A1 | 7/2021 | Kasada |
| 2021/0295868 A1 | 9/2021 | Kataguchi et al. |
| 2022/0028420 A1 | 1/2022 | Kasada |

FOREIGN PATENT DOCUMENTS

| | | |
|---|---|---|
| JP | 2017-068884 A | 4/2017 |
| JP | 6195872 B2 | 9/2017 |
| JP | 2018-110045 A | 7/2018 |
| JP | 2018-170058 A | 11/2018 |

OTHER PUBLICATIONS

Office Action dated Jun. 29, 2021 in U.S. Appl. No. 17/155,695.
Office Action dated Sep. 2, 2021 in U.S. Appl. No. 17/155,540.
Notice of Allowance dated Nov. 1, 2021 in U.S. Appl. No. 17/155,695.
Notice of Allowance dated Oct. 8, 2021 in U.S. Appl. No. 17/155,777.
Office Action dated Sep. 24, 2021 in U.S. Appl. No. 17/155,536.
Office Action dated Sep. 24, 2021 in U.S. Appl. No. 17/155,738.
U.S. Appl. No. 17/490,008, filed Sep. 30, 2021 (Kasada).
Notice of Allowance dated Dec. 21, 2021 in U.S. Appl. No. 17/155,540.
Notice of Allowance dated Feb. 9, 2022 in U.S. Appl. No. 17/155,738.
Office Action dated Apr. 27, 2022 in U.S. Appl. No. 17/155,536.
Notice of Allowance dated Jun. 13, 2022 in U.S. Appl. No. 17/490,008.

MAGNETIC RECORDING MEDIUM, MAGNETIC RECORDING AND REPRODUCING APPARATUS, MAGNETIC TAPE CARTRIDGE, AND MAGNETIC TAPE CARTRIDGE GROUP

CROSS-REFERENCE TO RELATED APPLICATIONS

This application claims priority under 35 U.S.C 119 to Japanese Patent Application No. 2020-010313 filed on Jan. 24, 2020. The above application is hereby expressly incorporated by reference, in its entirety, into the present application.

BACKGROUND OF THE INVENTION

1. Field of the Invention

The present invention relates to a magnetic recording medium, a magnetic recording and reproducing apparatus, a magnetic tape cartridge, and a magnetic tape cartridge group.

2. Description of the Related Art

Recording of data on a magnetic recording medium and reproducing of recorded data are usually performed by causing a magnetic layer surface of the magnetic recording medium and a magnetic head (hereinafter, simply referred to as a "head".) to come into contact with each other to be slid on each other (for example, see JP2005-092967A).

SUMMARY OF THE INVENTION

Data recorded on various recording media such as a magnetic recording medium is called hot data, warm data, or cold data depending on an access frequency (reproduction frequency). The access frequency decreases in the order of hot data, warm data, and cold data, and the cold data is usually stored in the recording medium while being recorded for a long period of 10 years or more (for example, several decades). Recording and storing such cold data is called archiving (archive). With dramatic increase in the amount of information and digitization of various kinds of information in recent years, the amount of cold data recorded and stored in the magnetic recording medium increases, and therefore, attention is paid to a magnetic recording and reproducing system suitable for archiving.

Conventionally, in a test of a magnetic recording and reproducing apparatus (generally referred to as a "drive".), since a usage form in which an access frequency is higher than that of an archive application was assumed, usually, one magnetic recording medium was repeatedly slid with respect to the same head without replacing the magnetic recording medium with a new one.

With respect to this, in recent years, a green tape test (GTT) has been proposed as the test of the magnetic recording and reproducing apparatus. In the GTT, assuming a usage form specific to an archive application in which cold data having a low access frequency is recorded and reproduced, a plurality (for example, several hundreds) of new magnetic recording media are slid with respect to one head while replacing the magnetic recording medium.

As described above, the GTT is different from the test of the conventional magnetic recording and reproducing apparatus. Therefore, in a case where the GTT is adopted as the test of the magnetic recording and reproducing apparatus, it is expected that a new performance different from the conventional one is required for the magnetic recording medium. In this regard, the present inventor has considered that a magnetic recording medium that can contribute to obtaining a favorable reproduction quality in the GTT will be desired in the future. A favorable reproduction quality in the GTT can be evaluated by, for example, suppressing occurrence of reproduction errors in a case where a plurality of magnetic recording media are sequentially slid with respect to one head and data is read out from each magnetic recording medium in the GTT under an environment of a low temperature and a low humidity. A magnetic recording medium capable of exhibiting such performance in the GTT, which is a test assuming a usage form specific to an archive application, can be said to be a magnetic recording medium suitable for an archive recording medium.

In view of the above description, an object of an aspect of the present invention is to provide a magnetic recording medium suitable for an archive recording medium, and more specifically, to provide a magnetic recording medium that can contribute to obtaining a favorable reproduction quality in a green tape test (GTT) under an environment of a low temperature and a low humidity.

An aspect of the present invention relates to a magnetic recording medium comprising:
  a non-magnetic support; and
  a magnetic layer including ferromagnetic powder,
  in which a number distribution A of a plurality of bright regions, based on equivalent circle diameters thereof, in a binarized image of a secondary electron image obtained by imaging a surface of the magnetic layer by a scanning electron microscope at an acceleration voltage of 5 kV satisfies the following (1) to (3):
    (1) bright regions having an equivalent circle diameter of 1 nm or more and 50 nm or less are 10,000 or more and 30,000 or less;
    (2) bright regions having an equivalent circle diameter of 51 nm or more and 100 nm or less are 7,000 or more and 25,000 or less; and
    (3) bright regions having an equivalent circle diameter of 101 nm or more are 3,000 or more and 7,000 or less, and
  a number distribution B of a plurality of dark regions, based on equivalent circle diameters thereof, in a binarized image of a secondary electron image obtained by imaging a surface of the magnetic layer by a scanning electron microscope at an acceleration voltage of 2 kV satisfies the following (4) to (6):
    (4) dark regions having an equivalent circle diameter of 1 nm or more and 50 nm or less are 100 or more and 1,000 or less;
    (5) dark regions having an equivalent circle diameter of 51 nm or more and 100 nm or less are 200 or more and 5,000 or less; and
    (6) dark regions having an equivalent circle diameter of 101 nm or more are 0 or more and 200 or less.

In one embodiment, a total thickness of the magnetic recording medium may be 5.3 µm or less.

In one embodiment, the magnetic recording medium may further comprise: a non-magnetic layer including non-magnetic powder between the non-magnetic support and the magnetic layer.

In one embodiment, the magnetic recording medium may further comprise: a back coating layer including non-magnetic powder on a surface side of the non-magnetic support opposite to a surface side provided with the magnetic layer.

In one embodiment, the magnetic layer may include two or more types of non-magnetic powder.

In one embodiment, the non-magnetic powder of the magnetic layer may include alumina powder.

In one embodiment, the non-magnetic powder of the magnetic layer may include carbon black.

In one embodiment, the ferromagnetic powder may be hexagonal barium ferrite powder.

In one embodiment, the ferromagnetic powder may be hexagonal strontium ferrite powder.

In one embodiment, the ferromagnetic powder may be ε-iron oxide powder.

In one embodiment, the magnetic recording medium may be a magnetic tape.

Another aspect of the present invention relates to a magnetic recording and reproducing apparatus comprising the magnetic recording medium.

Still another aspect of the present invention relates to a magnetic tape cartridge comprising the magnetic recording medium that is a magnetic tape.

Still another aspect of the present invention relates to a magnetic tape cartridge group comprising a plurality of the magnetic tape cartridges.

In one embodiment, in the magnetic tape cartridge group, in an environment of an atmosphere temperature of 13° C. and a relative humidity of 15%, a slope α (hereinafter, referred to as a "GTT slope α".) of a signal-to-noise-ratio (SNR) with respect to the number of rolls, the slope α being obtained by performing a reproduction test of a total of 200 rolls of the magnetic tape cartridges using a single magnetic head, may be 0.5 dB/decade or less.

According to one aspect of the present invention, it is possible to provide a magnetic recording medium suitable for an archive recording medium and a magnetic recording and reproducing apparatus including the magnetic recording medium. In addition, according to one aspect of the present invention, it is possible to provide a magnetic tape cartridge and a magnetic tape cartridge group including the magnetic recording medium that is a magnetic tape.

DESCRIPTION OF THE PREFERRED EMBODIMENTS

Magnetic Recording Medium

Figure 1:
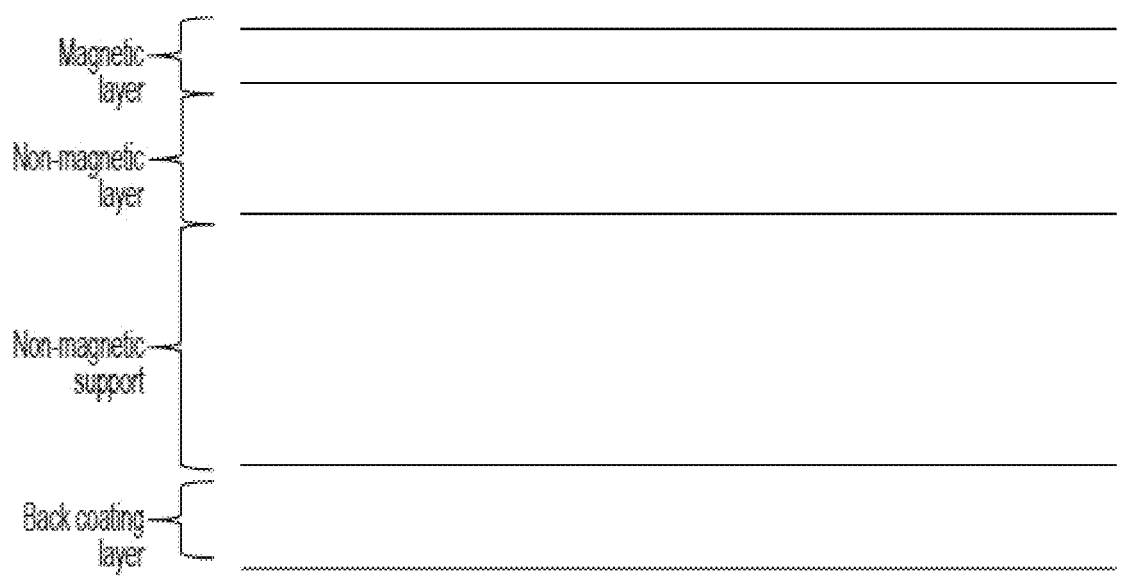
FIG. 1 is a schematic, cross-sectional illustration of the physical structure of an embodiment of the magnetic recording medium including a non-magnetic support, a non-magnetic layer, a magnetic layer, and a back coating layer.
Figure 2:
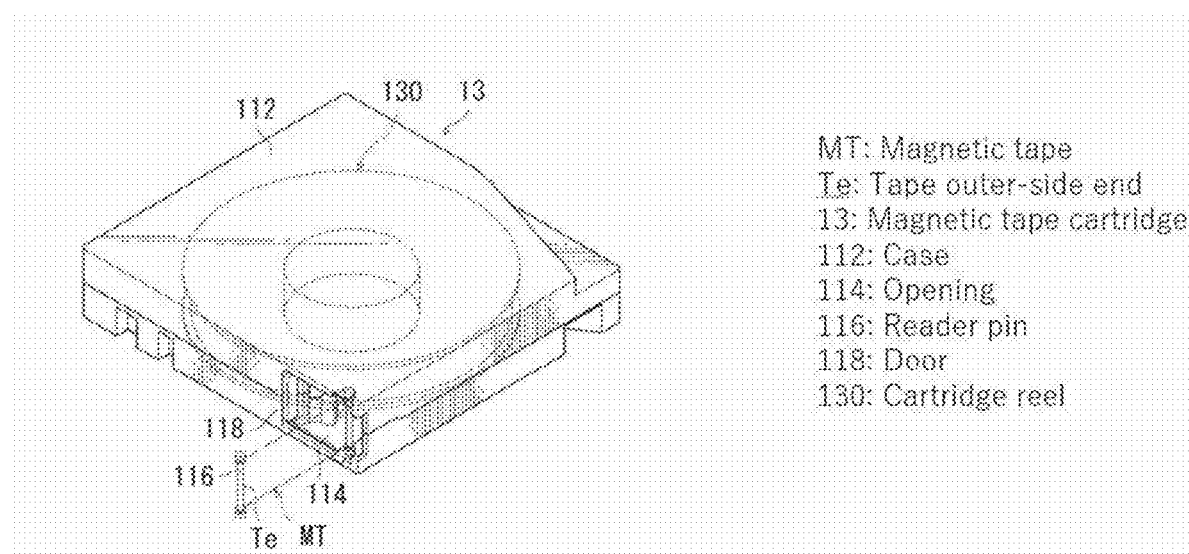
FIG. 2 is an illustration of the magnetic recording medium taking the form of a magnetic tape, the magnetic tape being incorporated into a tape cartridge. The reference symbols in FIG. 2 are as follows:
MT: Magnetic tape
Te: Tape outer-side end
13: Magnetic tape cartridge
112: Case
114: Opening
116: Reader pin
118: Door
130: Cartridge reel
Figure 3:
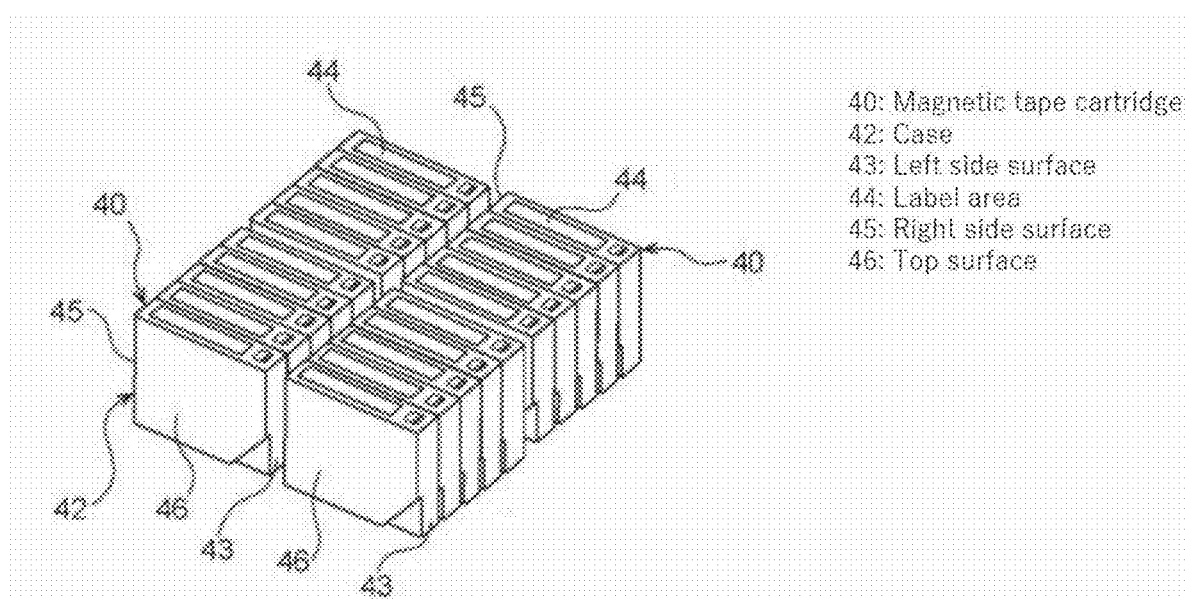
FIG. 3 illustrates a plurality of tape cartridges including the magnetic recording medium being utilized. The reference symbols in FIG. 3 are as follows:
40: Magnetic tape cartridge
42: Case
43: Left side surface
44: Label area
45: Right side surface
46: Top surface
Figure 4:
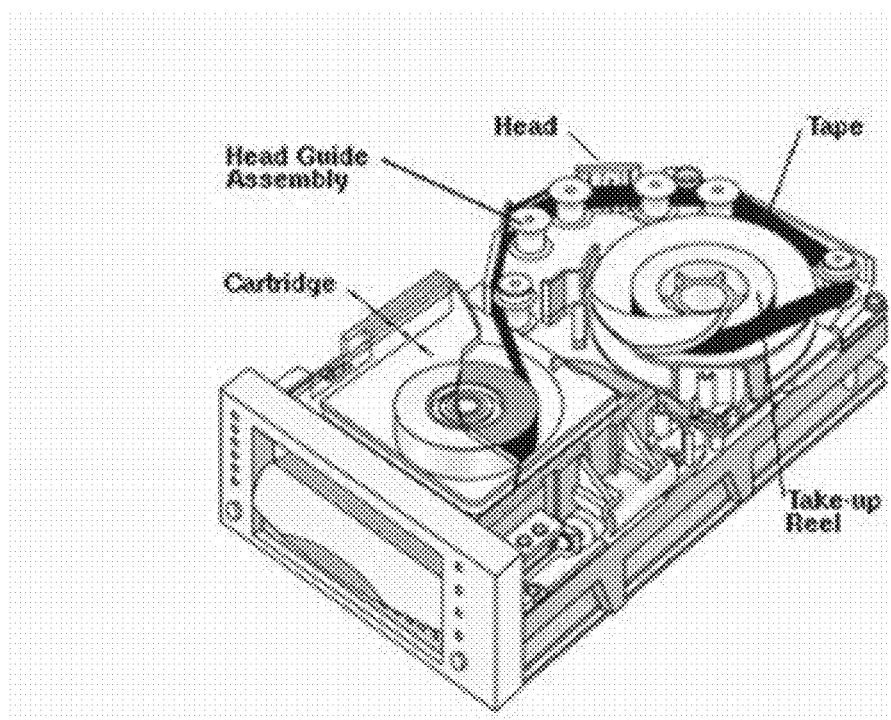
FIG. 4 illustrates a tape cartridge being utilized in conjunction with a magnetic recording and reproducing apparatus. The tape cartridge, head guide assembly, head, tape, and take-up reel are depicted.
Figure 5:
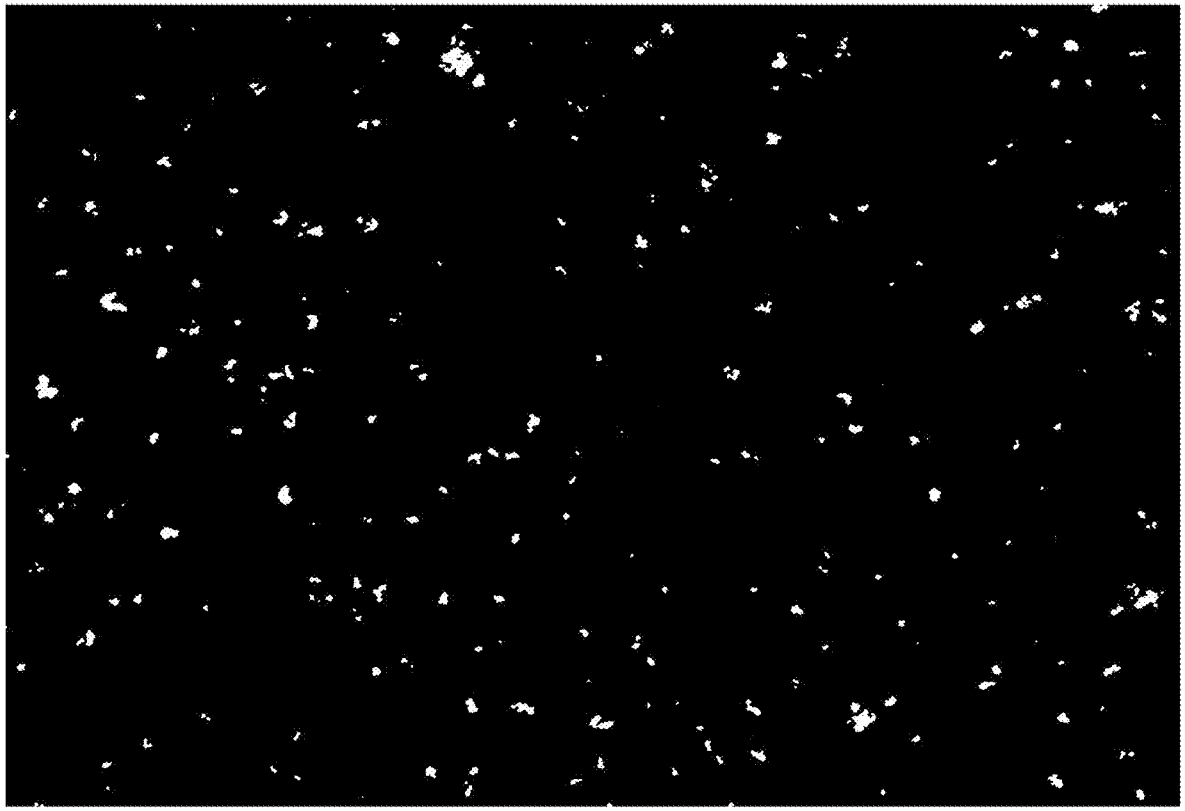
FIG. 5 shows an example of a binarized scanning electron microscope (SEM) image for the number distribution A.
Figure 6:
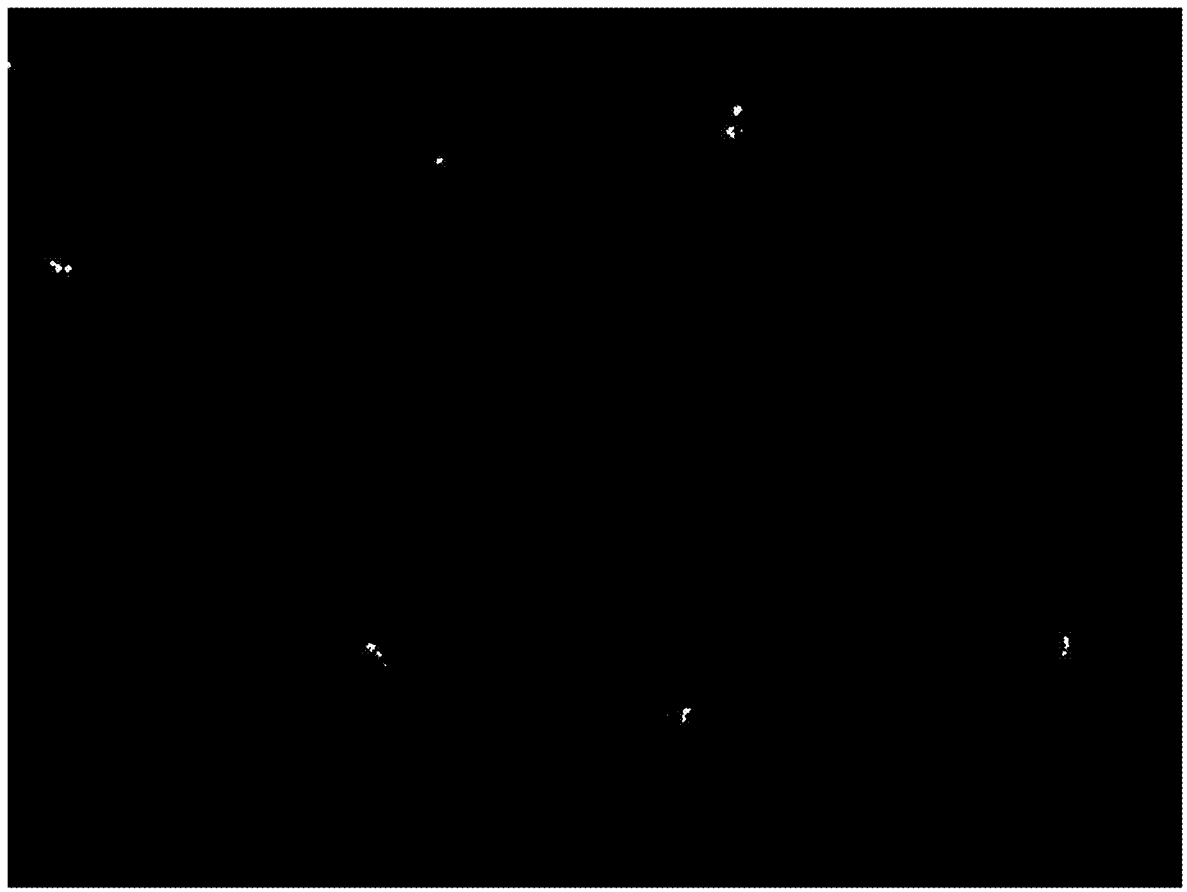
FIG. 6 shows an example of a binarized SEM image for the number distribution B.

An aspect of the present invention relates to a magnetic recording medium including: a non-magnetic support; and a magnetic layer including ferromagnetic powder, in which a number distribution A of a plurality of bright regions, based on equivalent circle diameters thereof, in a binarized image of a secondary electron image obtained by imaging a surface of the magnetic layer by a scanning electron microscope at an acceleration voltage of 5 kV satisfies the above-described (1) to (3), and a number distribution B of a plurality of dark regions, based on equivalent circle diameters thereof, in a binarized image of a secondary electron image obtained by imaging a surface of the magnetic layer by a scanning electron microscope at an acceleration voltage of 2 kV satisfies the above-described (4) to (6).

The present inventor has conducted extensive studies in order to obtain a magnetic recording medium capable of exhibiting the above-described performance, which is considered to be required in the future, and has considered that a value of the GTT slope α, which will be described in detail below, may correlate with a reproduction quality in a green tape test (GTT) under an environment of a low temperature and a low humidity. As a result of further intensive studies based on such knowledge, the number distribution A and the number distribution B of a state of a magnetic layer surface of the magnetic recording medium are controlled as described above. According to such a magnetic recording medium, it is possible to obtain a favorable reproduction quality in a green tape test (GTT) under an environment of a low temperature and a low humidity.

Hereinafter, the magnetic recording medium will be described more specifically.

A scanning electron microscope used for obtaining the number distribution A and the number distribution B in the present invention and the present specification is a field emission-scanning electron microscope (FE-SEM). As the FE-SEM, for example, FE-SEM S4800 manufactured by Hitachi, Ltd. can be used, and this FE-SEM was used in Examples described below.

In a case where the number distribution A and the number distribution B are respectively obtained, the magnetic layer surface is not coated before an SEM image is captured.

Each imaging is performed by selecting a non-imaging region on the magnetic layer surface.

The SEM image to be captured is a secondary electron image.

The equivalent circle diameter may be obtained in 1 nm increments by rounding off the first decimal point and rounding down the second decimal point.

In a case where the number distribution A is obtained, in the measurement of the number of bright regions, a bright region where only a part is included in the binarized image and the remaining part is outside the binarized image is excluded from the measurement object.

In addition, in a case where the number distribution B is obtained, in the measurement of the number of dark regions, a dark region where only a part is included in the binarized image and the remaining part is outside the binarized image is excluded from the measurement object.

In the present invention and the present specification, the "magnetic layer surface (surface of the magnetic layer)" has the same meaning as a surface of the magnetic recording medium on a magnetic layer side.

Measurement Method of Number Distribution

Measurement Method of Number Distribution A

In the present invention and the present specification, the "number distribution A" is a number distribution measured by the following method.

A secondary electron image of the magnetic layer surface of the magnetic recording medium to be measured is captured using a scanning electron microscope (FE-SEM). As imaging conditions, an acceleration voltage is 5 kV, an operating distance is 5 mm, and an imaging magnification is 10,000. In imaging, a non-imaging region on the magnetic layer surface is selected, focus adjustment is performed under the imaging conditions, and a secondary electron image is captured. A part (micron bar, cross mark, or the like) for displaying the size and the like is erased from the captured image, and a secondary electron image having the number of pixels of 960 pixels×1280 pixels is acquired.

The above operation is performed 100 times at different positions on the magnetic layer surface of the magnetic recording medium to be measured.

The secondary electron image thus acquired is taken into image processing software, and is binarized by the following procedure. As image analysis software, for example, free software ImageJ can be used. The image is divided into a bright region (white part) and a dark region (black part) by binarization processing.

For a threshold value for binarizing the secondary electron image acquired above, a lower limit is set to 210 gradations and an upper limit is set to 255 gradations, and the binarization processing is executed based on these two threshold values. After the binarization processing, noise component removal processing is performed by the image analysis software. The noise component removal processing can be performed by the following method, for example. In the image analysis software ImageJ, noise cut processing Despeckle is selected to remove the noise component.

For the binarized image thus obtained, the number of bright regions (that is, white parts) and the area of each bright region are obtained by the image analysis software. From the area of the bright region obtained here, the equivalent circle diameter of each bright region is obtained. Specifically, an equivalent circle diameter L is calculated from the obtained area A by $(A/\pi)^{(1/2)} \times 2 = L$. Here, the operator "^" represents a power.

The above processes are performed on the binarized image (100 images) obtained above. In this manner, the number distribution A is obtained.

Measurement Method of Number Distribution B

In the present invention and the present specification, the "number distribution B" is a number distribution measured by the following method.

A secondary electron image of the magnetic layer surface of the magnetic recording medium to be measured is captured using a scanning electron microscope (FE-SEM). As imaging conditions, an acceleration voltage is 2 kV, an operating distance is 5 mm, and an imaging magnification is 10,000. In imaging, a non-imaging region on the magnetic layer surface is selected, focus adjustment is performed under the imaging conditions, and a secondary electron image is captured. A part (micron bar, cross mark, or the like) for displaying the size and the like is erased from the captured image, and a secondary electron image having the number of pixels of 960 pixels×1280 pixels is acquired.

The above operation is performed 100 times at different positions on the magnetic layer surface of the magnetic recording medium to be measured.

The secondary electron image thus acquired is taken into image processing software, and is binarized by the following procedure. As image analysis software, for example, free software ImageJ can be used.

For a threshold value for binarizing the secondary electron image acquired above, a lower limit is set to 0 gradation and an upper limit is set to 75 gradations, and the binarization processing is executed based on these two threshold values. After the binarization processing, noise component removal processing is performed by the image analysis software. The noise component removal processing can be performed by the following method, for example. In the image analysis software ImageJ, noise cut processing Despeckle is selected to remove the noise component.

In the binarized image thus obtained, the number of dark regions (that is, black parts) and the area of each dark region are obtained by the image analysis software. From the area of the dark region obtained here, the equivalent circle diameter of each dark region is obtained. Specifically, an equivalent circle diameter L is calculated from the obtained area A by $(A/\pi)^{(1/2)} \times 2 = L$.

The above processes are performed on the binarized image (100 images) obtained above. In this manner, the number distribution B is obtained.

Number Distribution a and Number Distribution B

In the magnetic recording medium, the number distribution A obtained by the above-described method satisfies the following (1) to (3):

(1) bright regions having an equivalent circle diameter of 1 nm or more and 50 nm or less are 10,000 or more and 30,000 or less;

(2) bright regions having an equivalent circle diameter of 51 nm or more and 100 nm or less are 7,000 or more and 25,000 or less; and (3) bright regions having an equivalent circle diameter of 101 nm or more are 3,000 or more and 7,000 or less.

Further, in the magnetic recording medium, the number distribution B obtained by the above-described method satisfies the following (4) to (6):

(4) dark regions having an equivalent circle diameter of 1 nm or more and 50 nm or less are 100 or more and 1,000 or less;

(5) dark regions having an equivalent circle diameter of 51 nm or more and 100 nm or less are 200 or more and 5,000 or less; and (6) dark regions having an equivalent circle diameter of 101 nm or more are 0 or more and 200 or less.

The magnetic layer is usually formed by using a magnetic layer forming composition containing at least one kind of non-magnetic powder in addition to ferromagnetic powder. For the number distribution A and the number distribution B obtained by the above-described method, the present inventor considers that the number distribution A can be an index of an existence state of the non-magnetic powder (hereinafter, referred to as an "abrasive".) included in the magnetic layer on the magnetic layer surface in order to impart abradability to the magnetic layer surface. Further, the present inventor considers that the number distribution B can be an index of an existence state of the non-magnetic powder (hereinafter, referred to as a "filler".) included in the magnetic layer on the magnetic layer surface in order to form appropriate protrusions on the magnetic layer surface for controlling friction characteristics. The present inventor supposes that, by controlling the number distribution A and the number distribution B as described above, inhibition of the scrape of the head, the scrape of the magnetic recording medium, and/or the adhesion of foreign matter generated by some cause to the head in a GTT under an environment of a low temperature and a low humidity can contribute to obtaining a favorable reproduction quality in a GTT under an environment of a low temperature and a low humidity. The environment of a low temperature and a low humidity may be, for example, an environment of an atmosphere temperature of about 10° C. to 15° C. A humidity of the environment may be, for example, about 10% to 20% as a relative humidity.

Regarding the above (1), the number of bright regions having an equivalent circle diameter of 1 nm or more and 50 nm or less is 10,000 or more and 30,000 or less. From the viewpoint of cleanability, the number of such bright regions is preferably 12,000 or more, and more preferably 15,000 or more. In addition, from the viewpoint of surface property, the number of such bright regions is preferably 25,000 or less, and more preferably 20,000 or less.

Regarding the above (2), the number of bright regions having an equivalent circle diameter of 51 nm or more and 100 nm or less is 7,000 or more and 25,000 or less. From the viewpoint of cleanability, the number of such bright regions is preferably 7,500 or more, and more preferably 8,000 or more. In addition, from the viewpoint of surface property, the number of such bright regions is preferably 20,000 or less, and more preferably 15,000 or less.

Regarding the above (3), the number of bright regions having an equivalent circle diameter of 101 nm or more is 3,000 or more and 7,000 or less. From the viewpoint of cleanability, the number of such bright regions is preferably 3,500 or more, and more preferably 4,000 or more. In addition, from the viewpoint of surface property, the number of such bright regions is preferably 6,500 or less, and more preferably 6,000 or less. In an aspect, the number of the bright regions may be more than 3,000.

Regarding the above (4), the number of dark regions having an equivalent circle diameter of 1 nm or more and 50 nm or less is 100 or more and 1,000 or less. From the viewpoint of friction characteristics, the number of such dark regions is preferably 200 or more, and more preferably 300 or more. In addition, from the viewpoint of cleanability, the number of such dark regions is preferably 900 or less, and more preferably 800 or less. In an aspect, the number of the dark regions may be less than 1,000.

Regarding the above (5), the number of dark regions having an equivalent circle diameter of 51 nm or more and 100 nm or less is 200 or more and 5,000 or less. From the viewpoint of friction characteristics, the number of such dark regions is preferably 250 or more, and more preferably 300 or more. In addition, from the viewpoint of cleanability, the number of such dark regions is preferably 4,500 or less, and more preferably 4,000 or less.

Regarding the above (6), the number of dark regions having an equivalent circle diameter of 101 nm or more is 0 or more and 200 or less. From the viewpoint of friction characteristics, the number of such dark regions is preferably 10 or more, and more preferably 20 or more. In addition, from the viewpoint of cleanability, the number of such dark regions is preferably 180 or less, and more preferably 150 or less. In an aspect, the number of the dark regions may be less than 200.

The number distribution A and the number distribution B are controlled by the kind of components to be added to the magnetic layer forming composition used for forming the magnetic layer and a method for preparing such composition (for example, a dispersion method, a classification method, or the like). For specific examples of the control method, Examples described below can be referred to.

Hereinafter, the magnetic recording medium will be described more specifically.

Magnetic Layer

Ferromagnetic Powder

As the ferromagnetic powder included in the magnetic layer, well-known ferromagnetic powder as ferromagnetic powder used in magnetic layers of various magnetic recording media can be used alone or in combination of two or more. From the viewpoint of improving recording density, it is preferable to use ferromagnetic powder having a small average particle size. From this point, the average particle size of ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, the average particle size of ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and the present specification, hexagonal strontium ferrite powder means that the main divalent metal atom included in this powder is a strontium atom, and hexagonal barium ferrite powder means that the main divalent metal atom included in this powder is a barium atom. The main divalent metal atom refers to a divalent metal atom that accounts for the most on an at % basis among divalent metal atoms included in the powder.

Here, a rare earth atom is not included in the above divalent metal atom. The "rare earth atom" in the present invention and the present specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is an aspect of the hexagonal ferrite powder, will be described in more detail.

An activation volume of hexagonal strontium ferrite powder is preferably in a range of 800 to 1600 nm$^3$. The finely granulated hexagonal strontium ferrite powder having an activation volume in the above range is suitable for manufacturing a magnetic recording medium exhibiting excellent electromagnetic conversion characteristics. The activation volume of the hexagonal strontium ferrite powder is preferably 800 nm$^3$ or more, for example, 850 nm$^3$ or more. Further, from the viewpoint of further improving the electromagnetic conversion characteristics, the activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The "activation volume" is a unit of magnetization reversal and is an index indicating the magnetic size of a particle. An activation volume described in the present invention and the present specification and an anisotropy constant Ku which will be described below are values obtained from the following relational expression between a coercive force Hc and an activation volume V, by performing measurement in an Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above formula, Ku: anisotropy constant (unit: J/m$^3$), Ms: saturation magnetization (Unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, improving thermal stability may include an anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content >1.0. A rare earth atom content in hexagonal strontium ferrite powder which will be described below is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content >1.0" means that in a particle of hexagonal strontium ferrite powder, rare earth atoms are unevenly distributed in a surface layer portion (that is, more than an inside). The surface layer portion in the present invention and the present specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in reproduction output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to the improvement of running durability of the magnetic recording medium. It is supposed that this may be because uneven distribution of rare earth atoms on a surface of a particle configuring hexagonal strontium ferrite powder contributes to the improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and the present specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from the viewpoint of further suppressing a decrease in reproduction output in repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described below and a bulk content of a rare earth atom obtained by total dissolution under dissolution conditions which will be described below, that is, "surface layer portion content/bulk content" exceeds 1.0 and may be 1.5 or more. "Surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described below and a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are examples, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From the viewpoint of increasing the reproduction output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m²/kg or more, and may be 47 A·m²/kg or more. On the other hand, from the viewpoint of noise reduction, σs is preferably 80 A·m²/kg or less and more preferably 60 A·m²/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1[kOe]=10⁶/4π[A/m]

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also referred to as an "M type".), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From the viewpoint of further suppressing a decrease in reproduction output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and the present specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

Preferable specific examples of the ferromagnetic powder include ferromagnetic metal powder. For details of the ferromagnetic metal powder, for example, descriptions disclosed in paragraphs 0137 to 0141 of JP2011-216149A and paragraphs 0009 to 0023 of JP2005-251351A can be referred to.

ε-Iron Oxide Powder

Preferable specific examples of the ferromagnetic powder include ε-iron oxide powder. In the present invention and the present specification, "ε-iron oxide powder" refers to ferromagnetic powder in which an ε-iron oxide type crystal structure is detected as a main phase by X-ray diffraction analysis. For example, in a case where the highest intensity diffraction peak is attributed to an ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic recording medium is not limited to the methods described here.

An activation volume of the ε-iron oxide powder is preferably in a range of 300 to 1500 nm³. The finely granulated ε-iron oxide powder having an activation volume in the above range is suitable for manufacturing a magnetic recording medium exhibiting excellent electromagnetic conversion characteristics. The activation volume of the ε-iron oxide powder is preferably 300 nm³ or more, for example, 500 nm³ or more. Further, from the viewpoint of further improving the electromagnetic conversion characteristics, the activation volume of the ε-iron oxide powder is more preferably 1400 nm³ or less, still more preferably 1300 nm³ or less, still more preferably 1200 nm³ or less, and still more preferably 1100 nm³ or less.

An index for reducing thermal fluctuation, in other words, improving thermal stability may include an anisotropy constant Ku. The ε-iron oxide powder preferably has Ku of $3.0 \times 10^4$ J/m³ or more, and more preferably has Ku of $8.0 \times 10^4$ J/m³ or more. Ku of the ε-iron oxide powder may be, for example, $3.0 \times 10^5$ J/m³ or less. Here, it means that the higher Ku is, the higher thermal stability is, this is preferable, and thus, a value thereof is not limited to the values exemplified above.

From the viewpoint of increasing the reproduction output in a case of reproducing data recorded on the magnetic recording medium, it is desirable that mass magnetization σs of the ferromagnetic powder included in the magnetic recording medium is high. In this regard, in an aspect, σs of the ε-iron oxide powder may be 8 A·m²/kg or more, and may be 12 A·m²/kg or more. On the other hand, from the viewpoint of noise reduction, σs of the ε-iron oxide powder is preferably 40 A·m²/kg or less and more preferably 35 A·m²/kg or less.

In the present invention and the present specification, unless otherwise noted, an average particle size of various types of powder such as ferromagnetic powder is a value measured by the following method using a transmission electron microscope.

The powder is imaged at an imaging magnification of 100,000 using a transmission electron microscope, and the image is printed on printing paper so that the total magnification ratio is 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described below is interposed between the particles. The term "particle" is used to describe powder in some cases.

As a method of taking sample powder from the magnetic recording medium in order to measure the particle size, a method disclosed in a paragraph 0015 of JP2011-048878A can be used, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

A content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from the viewpoint of improving recording density.

Binding Agent

The above-described magnetic recording medium may be a coating type magnetic recording medium, and may include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the binding agent described above, descriptions disclosed in paragraphs 0028 to 0031 of JP2010-024113A can be referred to. An average molecular weight of the resin used as the binding agent may be, for example, 10,000 or more and 200,000 or less as a weight-average molecular weight. The binding agent can be used in an amount of, for example, 1.0 to 30.0 parts by mass with respect to 100.0 parts by mass of the ferromagnetic powder.

Curing Agent

A curing agent can also be used together with the resin which can be used as the binding agent. As the curing agent, in an aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. Curing reaction proceeds during a process of forming a magnetic layer, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in a magnetic layer forming composition in an amount of, for example, 0 to 80.0 parts by mass, and preferably 50.0 to 80.0 parts by mass, from the viewpoint of improving a strength of the magnetic layer, with respect to 100.0 parts by mass of the binding agent.

Additive

The magnetic layer may include one or more kinds of additives, as necessary. As the additives, the curing agent described above is used as an example. In addition, examples of the additive which can be included in the magnetic layer include non-magnetic powder, a lubricant, a dispersing agent, a dispersing assistant, a fungicide, an antistatic agent, and an antioxidant. For example, for the lubricant, descriptions disclosed in paragraphs 0030 to 0033, 0035, and 0036 of JP2016-126817A can be referred to. The non-magnetic layer described later may include a lubricant. For the lubricant which may be included in the non-magnetic layer, descriptions disclosed in paragraphs 0030, 0031, and 0034 to 0036 of JP2016-126817A can be referred to. For the dispersing agent, descriptions disclosed in paragraphs 0061 and 0071 of JP2012-133837A can be referred to.

Examples of the dispersing agent that can be added to the magnetic layer forming composition include a well-known dispersing agent for improving the dispersibility of ferromagnetic powder such as a carboxy group-containing compound and a nitrogen-containing compound. For example, the nitrogen-containing compound may be any of a primary amine represented by $NH_2R$, a secondary amine represented by $NHR_2$, and a tertiary amine represented by $NR_3$. In the above, R represents any structure configuring the nitrogen-containing compound, and a plurality of R's may be the same as or different from each other. The nitrogen-containing compound may be a compound (polymer) having a plurality of repeating structures in the molecule. It is considered that a nitrogen-containing portion of the nitrogen-containing compound functions as an adsorbing portion on the particle surface of the ferromagnetic powder, which is the reason why the nitrogen-containing compound can function as a dispersing agent. Examples of the carboxy group-containing compound include a fatty acid such as oleic acid. It is considered that a carboxy group of the carboxy group-containing compound functions as an adsorbing portion on the particle surface of the ferromagnetic powder, which is the reason why the carboxy group-containing compound can function as a dispersing agent. It is also preferable to use the carboxy group-containing compound and the nitrogen-containing compound in combination. The amount of these dispersing agents used can be set appropriately.

The dispersing agent may be added to a non-magnetic layer forming composition. For the dispersing agent which can be included in the non-magnetic layer forming composition, a description disclosed in paragraph 0061 of JP2012-133837A can be referred to.

Abrasive

As described above, it is considered that the number distribution A can be an index of the existence state of the abrasive on the magnetic layer surface. Therefore, the number distribution A can be controlled by the kind of the non-magnetic powder added as the abrasive. As the abrasive, non-magnetic powder having a Mohs hardness of more than 8 is preferable, and non-magnetic powder having a Mohs hardness of 9 or more is more preferable. A maximum value of a Mohs hardness is 10. The abrasive can be powder of an inorganic substance and can also be powder of an organic substance. The abrasive can be inorganic or organic oxide powder or carbide powder. Examples of the carbide include boron carbide (for example, $B_4C$) and titanium carbide (for example, $TiC$). Diamond can also be used as the abrasive. In an aspect, the abrasive is preferably inorganic oxide powder. Specifically, examples of the inorganic oxide include alumina (for example, $Al_2O_3$), titanium oxide (for example, $TiO_2$), cerium oxide (for example, $CeO_2$), and zirconium oxide (for example, $ZrO_2$), among these, alumina is preferable. A Mohs hardness of alumina is about 9. For the alumina powder, a description disclosed in a paragraph 0021 of JP2013-229090A can be referred to. A specific surface area can be used as an index of the particle size of the abrasive. It can be considered that the larger the specific surface area, the smaller the particle size of the primary particles of particles configuring the abrasive. As the abrasive, it is preferable to use an abrasive having a specific surface area (hereinafter, referred to as a "BET specific surface area".) measured by a Brunauer-Emmett-Teller (BET) method of 14 $m^2/g$ or more. Further, from the viewpoint of the dispersibility, it is preferable to use an abrasive having a BET specific surface area of 40 $m^2/g$ or less. A content of the abrasive in the magnetic layer is preferably 1.0 to 20.0 parts by mass, and more preferably 1.0 to 18.0 parts by mass, with respect to 100.0 parts by mass of the ferromagnetic powder. As the abrasive, only one kind of non-magnetic powder can be used, and two or more kinds of non-magnetic powder having different compositions and/or physical properties (for example, size) can also be used. In a case where two or more kinds of non-magnetic powder are used as the abrasive, the content of the abrasive means the total content of the two or more kinds of non-magnetic powder. The same applies to contents of various components in the present invention and the present specification. The abrasive is preferably subjected to a dispersion treatment separately from the ferromagnetic powder (separate dispersion), and more preferably subjected to a dispersion treatment separately from the filler described below (separate dispersion). In a case where the magnetic layer forming composition is prepared, it is preferable to prepare two or more kinds of dispersion liquids having different components and/or dispersion conditions as a dispersion liquid of the abrasive (hereinafter, referred to as an "abrasive liquid".) in order to control the number distribution A.

A dispersing agent can also be used for adjusting the dispersion state of the dispersion liquid of the abrasive. Examples of a compound that can function as a dispersing agent for improving the dispersibility of the abrasive include an aromatic hydrocarbon compound having a phenolic hydroxy group. The "phenolic hydroxy group" refers to a hydroxy group directly bonded to an aromatic ring. The aromatic ring included in the aromatic hydrocarbon compound may be a monocyclic ring, a polycyclic structure, or a fused ring. From the viewpoint of improving the dispersibility of the abrasive, an aromatic hydrocarbon compound including a benzene ring or a naphthalene ring is preferable. Further, the aromatic hydrocarbon compound may have a substituent other than the phenolic hydroxy group. Examples of the substituent other than the phenolic hydroxy group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxy groups included in one molecule of the aromatic hydrocarbon compound may be one, two, three, or more.

A preferable aspect of the aromatic hydrocarbon compound having the phenolic hydroxy group includes a compound represented by Formula 100.

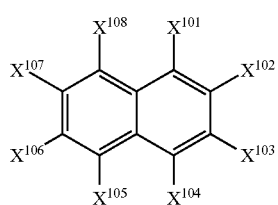

Formula 100

[In Formula 100, two of $X^{101}$ to $X^{108}$ are hydroxy groups, and the other six independently represent a hydrogen atom or a substituent.]

In the compound represented by Formula 100, the substitution positions of two hydroxy groups (phenolic hydroxy groups) are not particularly limited.

In the compound represented by Formula 100, two of $X^{101}$ to $X^{108}$ are hydroxy groups (phenolic hydroxy groups), and the other six independently represent a hydrogen atom or a substituent. Further, in $X^{101}$ to $X^{108}$, moieties other than the two hydroxy groups may all be hydrogen atoms, or some or all of them may be substituents. As a substituent, the substituent described above can be exemplified. As a substituent other than the two hydroxy groups, one or more phenolic hydroxy groups may be included. From the viewpoint of improving the dispersibility of the abrasive, it is preferable that the phenolic hydroxy group is not used except for the two hydroxy groups of $X^{101}$ to $X^{108}$. That is, the compound represented by Formula 100 is preferably dihydroxynaphthalene or a derivative thereof, and more preferably 2,3-dihydroxynaphthalene or a derivative thereof. Examples of preferred substituents represented by $X^{101}$ to $X^{108}$ include a halogen atom (for example, a chlorine atom or a bromine atom), an amino group, an alkyl group having 1 to 6 carbon atoms (preferably 1 to 4), a methoxy group and an ethoxy group, an acyl group, a nitro group and a nitroso group, and —CH$_2$OH group.

For the dispersing agent for improving the dispersibility of the abrasive, descriptions disclosed in paragraphs 0024 to 0028 of JP2014-179149A can be referred to.

The dispersing agent for improving the dispersibility of the abrasive can be used, for example, in a proportion of 0.5 to 20.0 parts by mass, and is preferably used in a proportion of 1.0 to 10.0 parts by mass to 100.0 parts by mass of the abrasive, for example, in a case where the abrasive liquid is prepared (for each abrasive liquid in a case where a plurality of the abrasive liquids are prepared).

Filler

As described above, it is considered that the number distribution B can be an index of the existence state of the non-magnetic powder (filler) included in the magnetic layer on the magnetic layer surface in order to form appropriate protrusions on the magnetic layer surface for controlling friction characteristics. Therefore, the number distribution B can be controlled by the kind of the non-magnetic powder added as the filler. An aspect of the filler includes carbon black. A BET specific surface area of carbon black is preferably 10 m$^2$/g or more, and more preferably 15 m$^2$/g or more. The BET specific surface area of carbon black is preferably 50 m$^2$/g or less, and more preferably 40 m$^2$/g or less, from the viewpoint of the ease of improving the dispersibility. In addition, another aspect of the filler includes colloidal particles. The colloidal particles are preferably inorganic colloidal particles, more preferably inorganic oxide colloidal particles, and still more preferably silica colloidal particles (colloidal silica), from the viewpoint of availability. In the present invention and the present specification, the "colloidal particles" refer to particles which are dispersed without precipitation to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at an optional mixing ratio. An average particle size of the colloidal particles can be, for example, 30 to 300 nm, and preferably 40 to 200 nm. A content of the filler in the magnetic layer is preferably 0.5 to 4.0 parts by mass, and more preferably 0.5 to 3.5 parts by mass, with respect to 100.0 parts by mass of the ferromagnetic powder. The filler is preferably subjected to a dispersion treatment separately from the ferromagnetic powder, and more preferably subjected to a dispersion treatment separately from the abrasive. In a case where the magnetic layer forming composition is prepared, it is preferable to prepare two or more kinds of dispersion liquids having different components and/or dispersion conditions as a dispersion liquid of the filler (hereinafter, referred to as a "filler liquid".) in order to control the number distribution B.

From the viewpoint of improving the dispersibility of carbon black, in an aspect, a compound having an ammonium salt structure of an alkyl ester anion represented by Formula 1 can be used in a case where the filler liquid is prepared. The "alkyl ester anion" can also be called an "alkyl carboxylate anion".

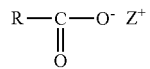

Formula I

In Formula 1, R represents an alkyl group having 7 or more carbon atoms or a fluorinated alkyl group having 7 or more carbon atoms, and $Z^+$ represents an ammonium cation.

From the viewpoint of improving the dispersibility of carbon black, in an aspect, two or more kinds of components capable of forming the compound having a salt structure can be used in a case of preparing the filler liquid. Thereby, in a case where the filler liquid is prepared, at least a part of these components can form the compound having a salt structure.

Unless otherwise noted, groups described below may have a substituent or may be unsubstituted. In addition, for a group having a substituent, the term "carbon number" means the number of carbon atoms not including the number of carbon atoms of the substituent, unless otherwise noted. In the present invention and the present specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, or the like), a cyano group, an amino group, a nitro group, an acyl group, a carboxy group, a salt of a carboxy group, a sulfonic acid group, and a salt of a sulfonic acid group.

Hereinafter, Formula 1 will be described in more detail.

In Formula 1, R represents an alkyl group having 7 or more carbon atoms or a fluorinated alkyl group having 7 or more carbon atoms. The fluorinated alkyl group has a structure in which some or all of the hydrogen atoms constituting the alkyl group are substituted with fluorine atoms. The alkyl group or the fluorinated alkyl group represented by R may have a straight chain structure or a branched structure, may be a cyclic alkyl group or a fluorinated alkyl group, and is preferably a straight chain structure. The alkyl group or the fluorinated alkyl group represented by R may have a substituent, may be unsubstituted, and is preferably unsubstituted. The alkyl group represented by R can be represented by, for example, $C_nH_{2n+1}$—. Here, n represents an integer of 7 or more. In addition, the fluorinated alkyl group represented by R may have a structure in which some or all of the hydrogen atoms constituting the alkyl group represented by, for example, $C_nH_{2n+1}$— are substituted with fluorine atoms. The carbon number of the alkyl group or the fluorinated alkyl group represented by R is 7 or more, preferably 8 or more, more preferably 9 or more, still more preferably 10 or more, still more preferably 11 or more, still more preferably 12 or more, and still more preferably 13 or more. In addition, the carbon number of the alkyl group or the fluorinated alkyl group represented by R is preferably 20 or less, more preferably 19 or less, and still more preferably 18 or less.

In Formula 1, $Z^+$ represents an ammonium cation. Specifically, the ammonium cation has the following structure. In the present invention and the present specification, "*" in the formula representing a part of a compound represents a bonding position between a structure of the part and an adjacent atom.

A nitrogen cation $N^+$ of the ammonium cation and an oxygen anion $O^-$ in Formula 1 may form a salt crosslinking group to form the ammonium salt structure of the alkyl ester anion represented by Formula 1. The inclusion of the compound having the ammonium salt structure of the alkyl ester anion represented by Formula 1 in the magnetic layer can be confirmed by analyzing the magnetic recording medium by X-ray photoelectron spectroscopy (electron spectroscopy for chemical analysis (ESCA)), infrared spectroscopy (IR), or the like.

In an aspect, the ammonium cation represented by $Z^+$ may be provided, for example, by a nitrogen atom of a nitrogen-containing polymer becoming a cation. The nitrogen-containing polymer means a polymer including a nitrogen atom. In the present invention and the present specification, the term "polymer" is used to encompass a homopolymer and a copolymer. The nitrogen atom may be included as an atom constituting a main chain of the polymer in an aspect, and may be included as an atom constituting a side chain of the polymer in an aspect.

An aspect of the nitrogen-containing polymer includes polyalkyleneimine. Polyalkyleneimine is a ring-opening polymer of alkyleneimine and is a polymer having a plurality of repeating units represented by Formula 2.

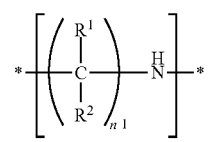

Formula 2

A nitrogen atom N constituting a main chain in Formula 2 is a nitrogen cation $N^+$ to provide the ammonium cation represented by $Z^+$ in Formula 1. Then, the ammonium salt structure can be formed with the alkyl ester anion, for example, as follows.

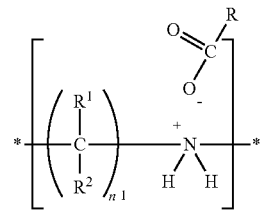

Hereinafter, Formula 2 will be described in more detail.

In Formula 2, $R^1$ and $R^2$ each independently represent a hydrogen atom or an alkyl group, and n1 represents an integer of 2 or more.

Examples of the alkyl group represented by $R^1$ or $R^2$ include an alkyl group having 1 to 6 carbon atoms, preferably an alkyl group having 1 to 3 carbon atoms, more preferably a methyl group or an ethyl group, and still more preferably a methyl group. The alkyl group represented by $R^1$ or $R^2$ is preferably an unsubstituted alkyl group. The combination of $R^1$ and $R^2$ in Formula 2 may be a form in which one is a hydrogen atom and the other is an alkyl group, a form in which both are hydrogen atoms, and a form in which both are alkyl groups (the same or different alkyl groups), and the form in which both are hydrogen atoms is preferable. As the alkyleneimine that provides the polyalkyleneimine, a structure having the lowest number of carbon atoms constituting a ring is ethyleneimine, and the number of carbon atoms in a main chain of the alkyleneimine (ethyleneimine) obtained by the ring opening of the ethyleneimine is 2. Therefore, n1 in Formula 2 is 2 or more. n1 in Formula 2 may be, for example, 10 or less, 8 or less, 6 or less, or 4 or less. The polyalkyleneimine may be a homopolymer including only the same structure as the repeating structure represented by Formula 2, or may be a copolymer including two or more different structures as the repeating structure represented by Formula 2. A number-average molecular weight of polyalkyleneimine that can be used to form the compound having the ammonium salt structure of the alkyl ester anion represented by Formula 1 may be, for example, 200 or more, preferably 300 or more, and more preferably 400 or more. The number-average molecular weight of the polyalkyleneimine may be, for example, 10,000 or less, preferably 5,000 or less, and more preferably 2,000 or less.

In the present invention and the present specification, the average molecular weight (weight-average molecular weight and number-average molecular weight) means a value measured by gel permeation chromatography (GPC)

with standard polystyrene conversion. Unless otherwise noted, the average molecular weight shown in Examples described below is a value (polystyrene-converted value) obtained by standard polystyrene conversion of the values measured under the following measurement conditions using GPC.

GPC device: HLC-8220 (manufactured by Tosoh Corporation)

Guard column: TSKguardcolumn Super HZM-H

Column: TSKgel Super HZ 2000, TSKgel Super HZ 4000, TSKgel Super HZ-M (manufactured by Tosoh Corporation, 4.6 mm (inner diameter)×15.0 cm, three columns connected in series)

Eluent: Tetrahydrofuran (THF), containing stabilizer (2,6-di-t-butyl-4-methylphenol)

Flow rate of eluent: 0.35 mL/min

Column temperature: 40° C.

Inlet temperature: 40° C.

Refractive index (RI) measurement temperature: 40° C.

Sample concentration: 0.3 mass %

Sample injection amount: 10 μL

Another aspect of the nitrogen-containing polymer includes polyallylamine. Polyallylamine is a polymer of allylamine and is a polymer having a plurality of repeating units represented by Formula 3.

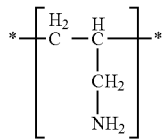

Formula 3

A nitrogen atom N constituting an amino group of a side chain in Formula 3 is a nitrogen cation $N^+$ to provide the ammonium cation represented by $Z^+$ in Formula 1. Then, the ammonium salt structure can be formed with the alkyl ester anion, for example, as follows.

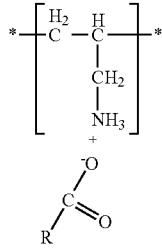

A weight-average molecular weight of polyallylamine that can be used to form the compound having the ammonium salt structure of the alkyl ester anion represented by Formula 1 may be, for example, 200 or more, preferably 1,000 or more, and more preferably 1,500 or more. The weight-average molecular weight of the polyallylamine may be, for example, 15,000 or less, preferably 10,000 or less, and more preferably 8,000 or less.

The inclusion of a compound having a structure derived from polyalkyleneimine or polyallylamine as the compound having the ammonium salt structure of the alkyl ester anion represented by Formula 1 in the magnetic layer can be confirmed by analyzing the magnetic layer surface by time-of-flight secondary ion mass spectrometry (TOF-SIMS) or the like.

The compound having the ammonium salt structure of the alkyl ester anion represented by Formula 1 may be a salt of the nitrogen-containing polymer and one or more kinds of fatty acids selected from the group consisting of fatty acids having 7 or more carbon atoms and fluorinated fatty acids having 7 or more carbon atoms. The nitrogen-containing polymer forming a salt may be one or more kinds of nitrogen-containing polymers, and may be, for example, a nitrogen-containing polymer selected from the group consisting of polyalkyleneimine and polyallylamine. The fatty acids forming a salt may be one or more kinds of fatty acids selected from the group consisting of fatty acids having 7 or more carbon atoms and fluorinated fatty acids having 7 or more carbon atoms. The fluorinated fatty acid has a structure in which some or all of the hydrogen atoms constituting an alkyl group bonded to a carboxy group COOH in the fatty acid are substituted with fluorine atoms. For example, the salt forming reaction can easily proceed by mixing the nitrogen-containing polymer and the above fatty acids at a room temperature. A room temperature is, for example, about 20° C. to 25° C. In an aspect, one or more kinds of nitrogen-containing polymers and one or more kinds of the above fatty acids are used as components of the filler liquid, and these are mixed in a process of preparing the filler liquid to allow the salt forming reaction to proceed. In addition, in an aspect, the filler liquid can be prepared by mixing one or more kinds of nitrogen-containing polymers and one or more kinds of the above fatty acids to form a salt before preparation of the filler liquid, and then using the salt as a component of the filler liquid. In a case where the nitrogen-containing polymer and the fatty acids are mixed to form an ammonium salt of the alkyl ester anion represented by Formula 1, in addition, a nitrogen atom constituting the nitrogen-containing polymer may react with a carboxy group of the fatty acids to form the following structure, and a form including such a structure is also included in the compound.

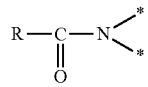

Examples of the fatty acids include fatty acids having an alkyl group described above as R in Formula 1 and fluorinated fatty acids having a fluorinated alkyl group described above as R in Formula 1.

A mixing ratio of the nitrogen-containing polymer used to form the compound having the ammonium salt structure of the alkyl ester anion represented by Formula 1 to the fatty acid is preferably 10:90 to 90:10, more preferably 20:80 to 85:15, and still more preferably 30:70 to 80:20 as a mass ratio of the nitrogen-containing polymer:the fatty acids. The compound having the ammonium salt structure of the alkyl ester anion represented by Formula 1 can be used, for example, in an amount of 1.0 to 20.0 parts by mass and is preferably used in an amount of 1.0 to 10.0 parts by mass with respect to 100.0 parts by mass of the carbon black, in a case where the filler liquid is prepared (for each filler liquid in a case where a plurality of the filler liquids are prepared). In addition, in a case where the filler liquid is prepared (for each filler liquid in a case where a plurality of the filler liquids are prepared), for example, 0.1 to 10.0 parts by mass of the nitrogen-containing polymer can be used and 0.5 to 8.0 parts by mass of the nitrogen-containing polymer is preferably used, per 100.0 parts by mass of the carbon black.

The above fatty acids can be used, for example, in an amount of 0.05 to 10.0 parts by mass and are preferably used in an amount of 0.1 to 5.0 parts by mass, per 100.0 parts by mass of the carbon black.

Non-Magnetic Layer

Next, the non-magnetic layer will be described. The above magnetic recording medium may have a magnetic layer directly on the surface of the non-magnetic support, or may have a magnetic layer on the surface of the non-magnetic support via a non-magnetic layer including non-magnetic powder. Non-magnetic powder used for the non-magnetic layer may be inorganic substance powder or organic substance powder. In addition, carbon black and the like can be used. Examples of the inorganic substance powder include types of powder of metal, metal oxide, metal carbonate, metal sulfate, metal nitride, metal carbide, and metal sulfide. These types of non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. A content (filling percentage) of the non-magnetic powder of the non-magnetic layer is preferably in a range of 50 to 90 mass % and more preferably in a range of 60 to 90 mass %.

The non-magnetic layer can include a binding agent, and can also include an additive. For other details of a binding agent or an additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

In the present invention and the present specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercive force equal to or smaller than 7.96 kA/m (100 Oe), or a layer having a residual magnetic flux density equal to or smaller than 10 mT and a coercive force equal to or smaller than 7.96 kA/m (100 Oe). It is preferable that the non-magnetic layer does not have a residual magnetic flux density and a coercive force.

Non-Magnetic Support

Next, the non-magnetic support (hereinafter, referred to as a "support".) will be described.

As the non-magnetic support, well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. These supports may be subjected to a corona discharge, a plasma treatment, an easy-bonding treatment, or a thermal treatment in advance.

Back Coating Layer

The magnetic recording medium may or may not have a back coating layer including non-magnetic powder on a surface side of the non-magnetic support opposite to a surface side having the magnetic layer. Preferably, the back coating layer contains one or both of carbon black and inorganic powder. The back coating layer can include a binding agent, and can also include an additive. In regards to the binding agent and the additive of the back coating layer, the well-known technology regarding the back coating layer can be applied, and the well-known technology regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Various Thicknesses

Regarding a thickness (total thickness) of the magnetic recording medium, it has been required to increase the recording capacity (increase the capacity) of the magnetic recording medium with the enormous increase in the amount of information in recent years. For example, as means for increasing the capacity of a tape-shaped magnetic recording medium (that is, a magnetic tape), a thickness of the magnetic tape may be reduced to increase a length of the magnetic tape accommodated in one roll of a magnetic tape cartridge. From this point, the thickness (total thickness) of the magnetic recording medium is preferably 5.6 μm or less, more preferably 5.5 μm or less, still more preferably 5.4 μm or less, and still more preferably 5.3 μm or less. In addition, from the viewpoint of ease of handling, the thickness of the magnetic recording medium is preferably 3.0 μm or more, and more preferably 3.5 μm or more.

The thickness (total thickness) of the magnetic recording medium can be measured by the following method.

Ten samples (for example, 5 to 10 cm in length) are cut out from any part of the magnetic recording medium, and these samples are stacked to measure the thickness. A value (thickness per sample) obtained by dividing the measured thickness by 1/10 is set as the total thickness. The thickness measurement can be performed using a well-known measuring device capable of measuring the thickness on the order of 0.1 μm.

A Thickness of the Non-Magnetic Support is Preferably 3.0 to 5.0 μm.

A thickness of the magnetic layer can be optimized according to a saturation magnetization amount, a head gap length, and a band of a recording signal of the used magnetic head, and is generally 0.01 μm to 0.15 μm, and from the viewpoint of high density recording, is preferably 0.02 μm to 0.12 μm, and more preferably 0.03 μm to 0.1 μm. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less, and more preferably 0.1 to 0.7 μm.

Various thicknesses such as the thickness of the magnetic layer can be obtained by the following method.

A cross section of the magnetic recording medium in a thickness direction is exposed by an ion beam, and then the exposed cross section observation is performed using a scanning electron microscope. Various thicknesses can be obtained as an arithmetic average of thicknesses obtained at two optional points in the cross section observation. Alternatively, the thickness of each layer can be obtained as a designed thickness calculated according to manufacturing conditions.

Manufacturing Process

Preparation of Each Layer Forming Composition

A process of preparing a composition for forming a magnetic layer, a non-magnetic layer, or a back coating layer can usually include at least a kneading process, a dispersing process, and a mixing process provided before and after these processes as necessary. Each process may be divided into two or more stages. Components used for the preparation of each layer forming composition may be added at an initial stage or in a middle stage of each process. As a solvent, one kind or two or more kinds of various solvents generally used for manufacturing a coating type magnetic recording medium can be used. For the solvent, for example, a description disclosed in a paragraph 0153 of JP2011-216149A can be referred to. In addition, each component may be separately added in two or more processes. For example, a binding agent may be added separately in a kneading process, a dispersing process, and a mixing process for adjusting a viscosity after dispersion. In order to manufacture the magnetic recording medium, a conventionally well-known manufacturing technology can be used in various processes. In the kneading process, preferably, a kneader having a strong kneading force such as an open kneader, a continuous kneader, a pressure kneader, or an extruder is used. For details of the kneading treatment, descriptions disclosed in JP1989-106338A (JP-H01-106338A) and JP1989-079274A (JP-H01-079274A) can be referred to. As a dispersing device, a well-known dispersing device can be used. In any stage of preparing each layer forming composition, filtering may be performed by a well-known method. The filtering can be performed by using a filter, for example. As the filter used for the filtering, a filter having a pore diameter of 0.01 to 3 µm (for example, filter made of glass fiber or filter made of polypropylene) can be used, for example.

It is preferable that the abrasive liquid is prepared by being separately dispersed from the ferromagnetic powder and the filler. The dispersion state of the abrasive in the abrasive liquid can be adjusted according to the use or non-use of a dispersing agent for improving the dispersibility of the abrasive, the amount of the dispersing agent used, treatment conditions of a dispersion treatment such as bead dispersion, and treatment conditions of a classification treatment such as centrifugal separation. It is preferable to adjust the dispersion state of the abrasive in order to control the number distribution A. The abrasive liquid is preferably prepared as one or more kinds of abrasive liquids including an abrasive, a solvent, and preferably a binding agent, separately from the ferromagnetic powder and the filler, and can be used for preparing a magnetic layer forming composition. A commercially available device can be used for the dispersion treatment and the classification treatment. Conditions for performing these treatments are not particularly limited, and need only be set according to the type of the device to be used so that the number distribution A satisfies (1) to (3) described above.

In addition, it is preferable that the filler liquid is prepared by being separately dispersed from the ferromagnetic powder and the abrasive. The dispersion state of the filler in the filler liquid can be adjusted according to the use or non-use of a component for improving the dispersibility of the filler, the amount of the component used, treatment conditions of a dispersion treatment such as bead dispersion, and treatment conditions of a classification treatment such as centrifugal separation. In an aspect, one or more kinds of nitrogen-containing polymers and one or more kinds of the fatty acids described above are used as components of the filler liquid, and these are mixed in a process of preparing the filler liquid to allow the salt forming reaction to proceed. In addition, in an aspect, the filler liquid can be prepared by mixing one or more kinds of nitrogen-containing polymers and one or more kinds of the above fatty acids to form a salt before preparation of the filler liquid, and then using the salt as a component of the filler liquid. It is preferable to adjust the dispersion state of the filler in order to control the number distribution B. The filler liquid is preferably prepared as one or more kinds of abrasive liquids including a filler, a solvent, and preferably a binding agent, separately from the ferromagnetic powder and the abrasive, and can be used for preparing a magnetic layer forming composition. A commercially available device can be used for the stirring, the dispersion treatment, and the classification treatment. Conditions for performing these treatments are not particularly limited, and need only be set according to the type of the device to be used so that the number distribution B satisfies (4) to (6) described above.

Regarding the dispersion treatment of the magnetic layer forming composition, in an aspect, the dispersion treatment of the ferromagnetic powder is performed by the two-stage dispersion treatment, in which the coarse aggregation of the ferromagnetic powder is crushed by the first-stage dispersion treatment, and then the second-stage dispersion treatment can be performed in which the collision energy applied to the particles of the ferromagnetic powder by the collision with the dispersion beads is smaller than that in the first dispersion treatment. It is considered that such a dispersion treatment makes it possible to improve the dispersibility of the ferromagnetic powder and suppress the occurrence of chipping (partially lacking particles).

An example of the two-stage dispersion treatment includes a dispersion treatment including a first stage of obtaining a dispersion liquid by subjecting ferromagnetic powder, a binding agent, and a solvent to a dispersion treatment in the presence of first dispersion beads and a second stage of subjecting the dispersion liquid obtained in the first stage to a dispersion treatment in the presence of second dispersion beads having a smaller bead diameter and density than the first dispersion beads. Hereinafter, the above dispersion treatment will be further described.

In order to improve the dispersibility of the ferromagnetic powder, it is preferable that the first stage and the second stage described above are performed as a dispersion treatment before mixing the ferromagnetic powder with other powder components. For example, the first stage and the second stage are preferably performed as a dispersion treatment of a liquid (magnetic liquid) including ferromagnetic powder, a binding agent, a solvent, and an optionally added additive before mixing the ferromagnetic powder with the abrasive and the filler.

The bead diameter of the second dispersion beads is preferably $1/100$ or less of the bead diameter of the first dispersion beads, and more preferably $1/500$ or less of the bead diameter of the first dispersion beads. In addition, the bead diameter of the second dispersion beads may be, for example, $1/10,000$ or more of the bead diameter of the first dispersion beads. However, it is not limited to this range. For example, the bead diameter of the second dispersion beads is preferably in a range of 80 to 1,000 nm. On the other hand, the bead diameter of the first dispersion beads may be, for example, in a range of 0.2 to 1.0 mm.

In the present invention and the present specification, the bead diameter is a value measured by the same method as a method for measuring an average particle size of powder described above.

The second stage is preferably performed under a condition that, on a mass basis, the second dispersion beads are present in an amount of 10 times or more the amount of ferromagnetic hexagonal ferrite powder, and more preferably performed under a condition that the second dispersion beads are present in an amount of 10 times to 30 times the amount of ferromagnetic hexagonal ferrite powder.

On the other hand, the amount of the first dispersion beads in the first stage is also preferably in the above range.

The second dispersion beads are beads having a density lower than that of the first dispersion beads. The "density" is obtained by dividing the mass (unit: g) of the dispersion beads by the volume (unit: $cm^3$). The measurement is performed by an Archimedes method. The density of the second dispersion beads is preferably 3.7 $g/cm^3$ or less, and more preferably 3.5 $g/cm^3$ or less. The density of the second dispersion beads may be, for example, 2.0 $g/cm^3$ or more, and may be lower than 2.0 $g/cm^3$. Preferred second dispersion beads in terms of the density include diamond beads, silicon carbide beads, silicon nitride beads and the like, and preferred second dispersion beads in terms of the density and the hardness include diamond beads.

On the other hand, as the first dispersion beads, dispersion beads having a density of more than 3.7 g/cm$^3$ are preferable, dispersion beads having a density of 3.8 g/cm$^3$ or more are more preferable, and dispersion beads having a density of 4.0 g/cm$^3$ or more are still more preferable. The density of the first dispersion beads may be, for example, 7.0 g/cm$^3$ or less, and may be more than 7.0 g/cm$^3$. As the first dispersion beads, zirconia beads, alumina beads, and the like are preferably used, and zirconia beads are more preferably used.

The dispersion time is not particularly limited and need only be set according to the type of the dispersing device used.

Coating Process

The magnetic layer can be formed by directly applying the magnetic layer forming composition onto the surface of the non-magnetic support or performing multilayer applying of the magnetic layer forming composition with the non-magnetic layer forming composition in order or at the same time. The back coating layer can be formed by applying the back coating layer forming composition onto a surface of the non-magnetic support opposite to a surface having the non-magnetic layer and/or the magnetic layer (or to be provided with the non-magnetic layer and/or the magnetic layer). For details of coating for forming each layer, a description disclosed in a paragraph 0066 of JP2010-231843A can be referred to.

Other Processes

Well-known technologies can be applied to other various processes for manufacturing the magnetic recording medium. For the various processes, for example, descriptions disclosed in paragraphs 0067 to 0070 of JP2010-231843A can be referred to. For example, a coating layer of the magnetic layer forming composition can be subjected to an orientation treatment in an orientation zone while the coating layer is in a wet state. For the orientation treatment, the various well-known technologies including a description disclosed in a paragraph 0052 of JP2010-024113A can be used. For example, a vertical orientation treatment can be performed by a well-known method such as a method using a polar opposing magnet. In the orientation zone, a drying speed of the coating layer can be controlled depending on a temperature and a flow rate of dry air and/or a transportation speed in the orientation zone. The coating layer may be preliminarily dried before the transportation to the orientation zone. As an example, a magnetic field intensity in the vertical orientation treatment may be 0.1 to 1.5 T.

The magnetic recording medium according to an aspect of the present invention may be a tape-shaped magnetic recording medium (magnetic tape) or a disk-shaped magnetic recording medium (magnetic disk). For example, for the magnetic tape, a long magnetic tape original roll can be obtained through various processes. The obtained magnetic tape original roll is cut (slit) by a well-known cutter to have a width of the magnetic tape to be wound around the magnetic tape cartridge. The width is determined according to the standard, and is typically ½ inches. ½ inches=12.65 mm. A servo pattern is usually formed on the magnetic tape obtained by slitting. Details of the servo pattern will be described below. The magnetic tape is usually accommodated in a magnetic tape cartridge and the magnetic tape cartridge is mounted in the magnetic recording and reproducing apparatus.

Formation of Servo Pattern

It is possible to form a servo pattern in the magnetic recording medium by a well-known method in order to enable tracking control of the magnetic head in the magnetic recording and reproducing apparatus, control of a running speed of the magnetic recording medium, and the like. The "formation of the servo pattern" can also be referred to as "recording of a servo signal". Hereinafter, the formation of the servo patterns will be described using a magnetic tape as an example.

The servo pattern is usually formed along a longitudinal direction of the magnetic tape. Examples of control (servo control) types using a servo signal include a timing-based servo (TBS), an amplitude servo, and a frequency servo.

As shown in a european computer manufacturers association (ECMA)-319 (June 2001), a magnetic tape conforming to a linear tape-open (LTO) standard (generally referred to as an "LTO tape".) employs a timing-based servo system. In the timing-based servo system, the servo pattern is formed by continuously disposing a plurality of pairs of non-parallel magnetic stripes (also referred to as "servo stripes".) in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of the servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information".) is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319 (June 2001). In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A servo pattern forming head is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while inverting a direction of the magnetic field applied to the magnetic tape. On the other hand, the DC erasing is performed by applying a one-direction magnetic field to the magnetic tape. As the DC erasing, there are two methods. A first method is horizontal DC erasing of applying a one-direction magnetic field along a longitudinal direction of the magnetic tape. A second method is vertical DC erasing of applying a one-direction magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed on the magnetic tape, the servo pattern is formed so that the direction of the magnetic field is reverse to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

Magnetic Tape Cartridge

An aspect of the present invention relates to a magnetic tape cartridge including the magnetic recording medium that is a magnetic tape.

The details of the magnetic tape included in the above tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

Magnetic Tape Cartridge Group

An aspect of the present invention relates to a magnetic tape cartridge group including a plurality of the magnetic tape cartridges.

The magnetic tape cartridge group includes a plurality of the magnetic tape cartridges including magnetic tapes in which the number distribution A satisfies the above (1) to (3) and the number distribution B satisfies the above (4) to (6). The number of magnetic tape cartridges included (referred to as the "number of rolls") may be 200 or more, 1,000 or more, or 3,000 or more. In an aspect, the number of rolls may be, for example, 5,000 or less or 4,000 or less. The magnetic tape cartridge group may be, for example, a magnetic tape cartridge group sold by the same manufacturer as a magnetic tape cartridge for the same standard.

In the magnetic tape cartridge group, in an environment of an atmosphere temperature of 13° C. and a relative humidity of 15%, a slope α (GTT slope α) of a signal-to-noise-ratio with respect to the number of rolls, the slope α being obtained by performing a reproduction test of a total of 200 rolls of the magnetic tape cartridges using a single magnetic head, is preferably 0.5 dB/decade or less, more preferably 0.4 dB/decade or less, and still more preferably 0.3 dB/decade or less, from the viewpoint of obtaining a favorable reproduction quality in the GTT under an environment of a low temperature and a low humidity. The GTT slope α may be, for example, 0 dB/decade or more, more than 0 dB/decade, or 0.1 dB/decade or more. A smaller value of the GTT slope α is preferable from the viewpoint of obtaining the more favorable reproduction quality in the GTT under an environment of a low temperature and a low humidity.

The GTT Slope α is Obtained by the Following Method.

In a case where the magnetic tape cartridge group to be measured consists of 200 rolls of the magnetic tape cartridges, all magnetic tape cartridges are used. In a case where the magnetic tape cartridge group to be measured consists of the magnetic tape cartridges having the number of rolls more than 200, randomly extracted 200 rolls of the magnetic tape cartridges are used. Each magnetic tape cartridge used for evaluation is randomly assigned a number from 1 to 200.

In an environment of an atmosphere temperature of 13° C. and a relative humidity of 15%, an average value of all channels of the signal-to-noise-ratio (SNR) for each magnetic tape cartridge is evaluated by an LTO8 drive. The evaluation result is analyzed by a least square method (logarithmic approximation). Specifically, the axis of abscissa (X axis) of the graph represents the logarithmic of the cartridge number, the axis of ordinate (Y axis) represents the SNR (average value of all channels) obtained for each magnetic tape cartridge, and these points are linearly approximated by the least square method. Thus, the GTT slope α (unit: dB/decade) is obtained as a slope α of Y=αX+β (α is a slope and β is an intercept).

Further, an aspect of the present invention relates to a magnetic tape cartridge group in which the GTT slope α obtained by the above method is 0.5 dB/decade or less. The above description can be referred to for the details of the magnetic tape cartridge group.

Magnetic Recording and Reproducing Apparatus

An aspect of the present invention relates to a magnetic recording and reproducing apparatus including the magnetic recording medium.

In the present invention and the present specification, the "magnetic recording and reproducing apparatus" means an apparatus capable of performing at least one of the recording of data on the magnetic recording medium or the reproducing of data recorded on the magnetic recording medium. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic recording medium and/or reproducing of the recorded data. For example, the magnetic recording and reproducing apparatus can attachably and detachably include the magnetic tape cartridge.

The magnetic head included in the magnetic recording and reproducing apparatus can be a recording head capable of performing the recording of data on the magnetic recording medium, or can be a reproducing head capable of performing the reproducing of data recorded on the magnetic recording medium. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various well-known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head".) can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic recording medium and/or reproducing of data recorded on the magnetic recording medium can be performed as the magnetic layer surface of the magnetic recording medium and the magnetic head come into contact with each other to be slid on each other. The above magnetic recording and reproducing apparatus need only include the magnetic recording medium according to one aspect of the present invention, and the well-known technology can be applied to the others.

For example, in a case where data is recorded on the magnetic recording medium on which a servo pattern is formed and/or recorded data is reproduced, first, tracking is performed using a servo signal obtained by reading the servo pattern. That is, by causing the servo signal reading element to follow a predetermined servo track, the element for data is controlled to pass over the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

In the magnetic recording and reproducing apparatus, for example, a GTT can be performed while replacing the magnetic recording medium (for example, a magnetic tape cartridge) with a new one. The magnetic recording medium according to an aspect of the present invention can contribute to obtaining a favorable reproduction quality in a green tape test (GTT) under an environment of a low temperature and a low humidity.

EXAMPLES

Hereinafter, the present invention will be described based on Examples. Here, the present invention is not limited to aspects shown in Examples. Unless otherwise specified, "parts" and "%" in the following description indicate "parts by mass" and "mass %". The processes and evaluations in the following description were performed in an environment of an atmosphere temperature of 23° C.±1° C., unless otherwise noted. In addition, "eq" described below indicates an equivalent that is a unit that cannot be converted into an SI unit system.

Preparation of Abrasive Liquid
Preparation of Abrasive Liquid A 2,3-dihydroxynaphthalene (manufactured by Tokyo Chemical Industry Co., Ltd.) having the amount shown in Table 1, 31.3 parts of a 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed liquid of methyl ethyl ketone and cyclohexanone at 1:1 (mass ratio) as a solvent were mixed with respect to 100.0 parts of the abrasive (alumina powder) shown in Table 1, and dispersed in the presence of zirconia beads (bead diameter: 0.1 mm) by a paint shaker for the time (beads dispersion time) shown in Table 1.

After the dispersion, the dispersion liquid obtained by separating the dispersion liquid and the beads with a mesh was subjected to centrifugal separation. The centrifugal separation was carried out using CS150GXL manufactured by Koki Holdings Co., Ltd. (the rotor used is S100AT6 manufactured by Koki Holdings Co., Ltd.) as a centrifugal separator at the rotation speed (rotation per minute (rpm)) shown in Table 1 for the time (centrifugal separation time) shown in Table 1. By this centrifugal separation, particles having a relatively large particle size were sedimented, and particles having a relatively small particle size were dispersed in a supernatant.

After that, the supernatant was collected by decantation. This collected liquid is called an "abrasive liquid A".

Preparation of Abrasive Liquids B and C

An abrasive liquid B and an abrasive liquid C were prepared in the same manner as in the preparation of the abrasive liquid A except that various items were changed as shown in Table 1.

TABLE 1

|  |  | Abrasive liquid A | Abrasive liquid B | Abrasive liquid C |
| --- | --- | --- | --- | --- |
| Preparation of abrasive liquid | Abrasive product name (manufactured by Sumitomo Chemical Co., Ltd.) | Hit80 | Hit70 | Hit70 |
|  | BET specific surface area of abrasive (m$^2$/g) | 30 | 20 | 20 |
|  | Content of abrasive liquid dispersing agent (2,3-dihydroxynaphthalene) | 3.0 parts | 3.0 parts | None |
|  | Beads dispersion time | 360 min | 180 min | 60 min |
| Centrifugal separation | Rotation speed | 5500 rpm | 3500 rpm | 1000 rpm |
|  | Centrifugal separation time | 4 min | 4 min | 4 min |

Preparation of Filler Liquid

Preparation of Filler Liquid D

Polyethyleneimine having the amount shown in Table 2, stearic acid having the amount shown in Table 2, and 570.0 parts of a mixed liquid of methyl ethyl ketone and cyclohexanone at 1:1 (mass ratio) as a solvent were mixed with respect to 100.0 parts of the filler (carbon black) shown in Table 2, and dispersed in the presence of zirconia beads (bead diameter: 0.1 mm) by a paint shaker for the time (beads dispersion time) shown in Table 2.

After the dispersion, the dispersion liquid obtained by separating the dispersion liquid and the beads with a mesh was subjected to centrifugal separation. The centrifugal separation was carried out using CS150GXL manufactured by Koki Holdings Co., Ltd. (the rotor used is S100AT6 manufactured by Koki Holdings Co., Ltd.) as a centrifugal separator at the rotation speed (rotation per minute (rpm)) shown in Table 2 for the time (centrifugal separation time) shown in Table 2. By this centrifugal separation, particles having a relatively large particle size were sedimented, and particles having a relatively small particle size were dispersed in a supernatant.

After that, the supernatant was collected by decantation. This collected liquid is called a "filler liquid D".

The polyethyleneimine is a commercially available product (number-average molecular weight of 600) manufactured by Nippon Shokubai Co., Ltd.

Preparation of Filler Liquids E to G

Filler liquids E to G were prepared in the same manner as in the preparation of the filler liquid D except that various items were changed as shown in Table 2.

Example 1

Preparation of Magnetic Layer Forming Composition

Magnetic Liquid

Ferromagnetic powder: 100.0 parts

Hexagonal barium ferrite powder ("BaFe" in Table 3) having an average particle size (average plate diameter) of 21 nm Oleic acid: 2.0 parts Vinyl chloride copolymer (MR-104 manufactured by Zeon Corporation): 10.0 parts SO$_3$Na group-containing polyurethane resin: 4.0 parts (weight-average molecular weight: 70,000, SO$_3$Na group: 0.07 meq/g)

Amine-based polymer (DISPERBYK-102 manufactured by BYK-Chemie): 6.0 parts

Methyl ethyl ketone: 150.0 parts

Cyclohexanone: 150.0 parts

Abrasive Liquid

Use the abrasive liquid shown in Table 3 so that the amount of abrasive in the abrasive liquid is the amount shown in Table 3

Filler Liquid

Use the filler liquid shown in Table 3 so that the amount of filler in the filler liquid is the amount shown in Table 3

Other Components

Stearic acid: 3.0 parts

Stearic acid amide: 0.3 parts

Butyl stearate: 6.0 parts

Methyl ethyl ketone: 110.0 parts

Cyclohexanone: 110.0 parts

Polyisocyanate (CORONATE (registered trademark) L manufactured by Tosoh Corporation): 3.0 parts Preparation Method Various components of the above magnetic liquid were dispersed using zirconia beads (first dispersion beads, den-

TABLE 2

|  |  | Filler liquid D | Filler liquid E | Filler liquid F | Filler liquid G |
| --- | --- | --- | --- | --- | --- |
| Preparation of filler liquid | Filler product name (carbon black manufactured by Asahi Carbon Co., Ltd.) | Asahi #50 | Asahi #50 | Asahi #50 | Asahi #50 |
|  | BET specific surface area of filler (m$^2$/g) | 23 | 23 | 23 | 23 |
|  | Polyethyleneimine | 1.0 part | 1.0 part | 1.0 part | None |
|  | Stearic acid | 2.0 parts | 2.0 parts | 2.0 parts | None |
|  | Beads dispersion time | 360 min | 60 min | 10 min | 180 min |
| Centrifugal separation | Rotation speed | 5500 rpm | 3500 rpm | 1000 rpm | 5500 rpm |
|  | Centrifugal separation time | 4 min | 4 min | 4 min | 4 min | sity of 6.0 g/cm³) having a bead diameter of 0.5 mm by a batch type vertical sand mill for 24 hours (first stage), and then filtered using a filter having a pore diameter of 0.5 μm. Thereby, a dispersion liquid A was prepared. The zirconia beads were used in an amount of 10 times the mass of the ferromagnetic powder on a mass basis.

After that, the dispersion liquid A was dispersed using diamond beads (second dispersion beads, density of 3.5 g/cm³) having a bead diameter of 500 nm by a batch type vertical sand mill for 1 hour (second stage), and a dispersion liquid (dispersion liquid B) in which the diamond beads were separated using a centrifugal separator was prepared. The diamond beads were used in an amount of 10 times the mass of the ferromagnetic powder on a mass basis.

The dispersion liquid B, the abrasive liquid, the filler liquid, and the other components described above were put into a dissolver stirrer, and stirred for 360 minutes at a circumferential speed of 10 m/sec. After that, an ultrasonic dispersion treatment was performed at a flow rate of 7.5 kg/min for 60 minutes by a flow type ultrasonic dispersing device, and then the obtained liquid was filtered three times through a filter having a pore diameter of 0.3 μm. Thereby, a magnetic layer forming composition was prepared.

Preparation of Non-Magnetic Layer Forming Composition

Various components of non-magnetic layer forming composition described below were dispersed using zirconia beads having a bead diameter of 0.1 mm by a batch type vertical sand mill for 24 hours, and then filtered using a filter having a pore diameter of 0.5 μm. Thereby, the non-magnetic layer forming composition was prepared.

Non-Magnetic Inorganic Powder

α-iron oxide: 100.0 parts
(average particle size: 10 nm, BET specific surface area: 75 m²/g)
Carbon black: 25.0 parts
(average particle size: 20 nm)
$SO_3Na$ group-containing polyurethane resin: 18.0 parts
(weight-average molecular weight: 70,000, $SO_3Na$ group content: 0.2 meq/g)
Stearic acid: 1.0 part
Cyclohexanone: 300.0 parts
Methyl ethyl ketone: 300.0 parts Preparation of Back Coating Layer Forming Composition Components other than a lubricant (stearic acid and butyl stearate), polyisocyanate and 200.0 parts of cyclohexanone among the various components of back coating layer forming composition described below were kneaded and diluted by an open kneader, and then subjected to a dispersion treatment of 12 passes using a horizontal beads mill dispersing device and zirconia beads having a bead diameter of 1 mm, by setting a bead filling percentage to 80 volume %, a circumferential speed of a rotor distal end to 10 m/sec, and a retention time per 1 pass to 2 minutes. After that, the remaining components were added and stirred by a dissolver, and the obtained dispersion liquid was filtered using a filter having a pore diameter of 1 μm. Thereby, a back coating layer forming composition was prepared.

Non-Magnetic Inorganic Powder

α-iron oxide: 80.0 parts
(average particle size: 0.15 μm, BET specific surface area: 52 m²/g)
Carbon black: 20.0 parts
(average particle size: 20 nm)
Vinyl chloride copolymer: 13.0 parts
Sulfonate group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts Manufacture of Magnetic Tape and Magnetic Tape Cartridge Group The non-magnetic layer forming composition prepared in the above section was applied onto a surface of a polyethylene naphthalate support having a thickness of 4.2 μm and was dried so that the thickness after drying is a thickness of 0.7 μm, and thus a non-magnetic layer was formed.

Next, the magnetic layer forming composition prepared in the above section was applied onto the non-magnetic layer so that the thickness after drying is 0.1 μm, and thus a coating layer was formed.

After that, while this coating layer of the magnetic layer forming composition is in a wet state, a vertical orientation treatment was performed by applying a magnetic field of a magnetic field intensity of 0.3 T in a direction perpendicular to a surface of the coating layer, and then the surface of the coating layer was dried. Thereby, a magnetic layer was formed.

After that, the back coating layer forming composition prepared in the above section was applied onto a surface of the support opposite to the surface on which the non-magnetic layer and the magnetic layer are formed and was dried so that the thickness after drying is 0.3 μm, and thus, a back coating layer was formed.

After that, a surface smoothing treatment (calendering treatment) was performed using a calender roll formed of only metal rolls at a speed of 100 m/min, a linear pressure of 300 kg/cm, and a calender temperature of 90° C. (surface temperature of calender roll).

After that, a heat treatment was performed for 36 hours in an environment of an atmosphere temperature of 70° C., and then a long magnetic tape original roll was slit to have ½ inches width to obtain a magnetic tape. A servo signal was recorded on the magnetic layer of the obtained magnetic tape by a commercially available servo writer to obtain a magnetic tape having a servo pattern (timing-based servo pattern) arranged according to a linear tape-open (LTO) ultrium format. The obtained magnetic tape (tape length: 960 m) was accommodated in a single reel type magnetic tape cartridge.

The above processes were repeated to manufacture a total of more than 200 rolls of magnetic tape cartridges (magnetic tape cartridge groups).

It could be confirmed by the following method that the magnetic layer of the magnetic tape includes the compound including the ammonium salt structure of the alkyl ester anion represented by Formula 1, which is formed of polyethyleneimine and stearic acid.

A sample is cut out from the magnetic tape, and X-ray photoelectron spectroscopy analysis is performed on the magnetic layer surface (measurement area: 300 μm×700 μm) using an ESCA device. Specifically, the wide scanning measurement is performed by the ESCA device under the following measurement conditions. In the measurement results, peaks are confirmed at a binding energy position of an ester anion and a binding energy position of an ammonium cation.

Device: AXIS-ULTRA manufactured by Shimadzu Corporation

Excited X-ray source: monochromatic Al-Kα ray
Scanning range: 0 to 1,200 eV

Pass energy: 160 eV
Energy resolution: 1 eV/step
Take-in time: 100 ms/step
Accumulation number: 5

In addition, a sample piece having a length of 3 cm is cut out from the magnetic tape, and the attenuated total reflection-fourier transform-infrared spectrometer (ATR-FT-IR) measurement (reflection method) is performed on the magnetic layer surface. In the measurement results, an absorption is confirmed at the wave number (1540 cm$^{-1}$ or 1430 cm$^{-1}$) corresponding to an absorption of COO$^-$ and the wave number (2400 cm$^{-1}$) corresponding to an absorption of an ammonium cation.

Examples 2 to 20 and Comparative Examples 1 to 18

A magnetic tape cartridge group was manufactured in the same manner as in Example 1 except that various items were changed as shown in Table 3.

Example 21

A magnetic tape cartridge group was manufactured in the same manner as in Example 3 except that hexagonal strontium ferrite powder ("SrFe1" in Table 3) manufactured as follows was used as the ferromagnetic powder.

1707 g of SrCO$_3$, 687 g of H$_3$BO$_3$, 1120 g of Fe$_2$O$_3$, 45 g of Al(OH)$_3$, 24 g of BaCO$_3$, 13 g of CaCO$_3$, and 235 g of Nd$_2$O$_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The hexagonal strontium ferrite powder obtained above had an average particle size of 18 nm, an activation volume of 902 nm$^3$, an anisotropy constant Ku of 2.2×10$^5$ J/m$^3$, and a mass magnetization σs of 49 A·m$^2$/kg.

12 mg of sample powder was taken from the hexagonal strontium ferrite powder obtained above, elemental analysis of the filtrated solution obtained by partially dissolving this sample powder under dissolution conditions exemplified above was performed by an ICP analyzer, and a surface layer portion content of a neodymium atom was determined.

Separately, 12 mg of sample powder was taken from the hexagonal strontium ferrite powder obtained above, elemental analysis of the filtrated solution obtained by totally dissolving this sample powder under dissolution conditions exemplified above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees Example 22

A magnetic tape cartridge group was manufactured in the same manner as in Example 3 except that hexagonal strontium ferrite powder ("SrFe2" in Table 3) manufactured as follows was used as the ferromagnetic powder.

1725 g of SrCO$_3$, 666 g of H$_3$BO$_3$, 1332 g of Fe$_2$O$_3$, 52 g of Al(OH)$_3$, 34 g of CaCO$_3$, and 141 g of BaCO$_3$ were weighed and mixed by a mixer to obtain a raw material mixture.

The obtained raw material mixture was dissolved in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The obtained hexagonal strontium ferrite powder had an average particle size of 19 nm, an activation volume of 1102 nm$^3$, an anisotropy constant Ku of $2.0 \times 10^5$ J/m$^3$, and a mass magnetization σs of 50 A·m$^2$/kg.

Example 23

A magnetic tape cartridge group was manufactured in the same manner as in Example 3 except that ε-iron oxide powder ("ε-iron oxide" in Table 3) manufactured as follows was used as the ferromagnetic powder.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at an internal temperature of the furnace of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was washed with pure water, and was dried in a heating furnace at an internal temperature of the furnace of 80° C. for 24 hours to obtain a ferromagnetic powder precursor.

The obtained ferromagnetic powder precursor was loaded into a heating furnace at an internal temperature of the furnace of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide (ε-Ga$_{0.28}$Co$_{0.05}$Ti$_{0.05}$Fe$_{1.62}$O$_3$). In addition, X-ray diffraction analysis is performed under the same condition as described above for the hexagonal strontium ferrite powder SrFe1, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

The obtained ε-iron oxide powder had an average particle size of 12 nm, an activation volume of 746 nm$^3$, an anisotropy constant Ku of $1.2 \times 10^5$ J/m$^3$, and a mass magnetization σs of 16 A·m$^2$/kg.

An activation volume and an anisotropy constant Ku of the above hexagonal strontium ferrite powder and ε-iron oxide powder are values obtained by the method described above using a vibrating sample magnetometer (manufactured by Toei Industry Co., Ltd.) for each ferromagnetic powder.

A mass magnetization σs is a value measured at a magnetic field intensity of 1194 kA/m (15 kOe) using a vibrating sample magnetometer (manufactured by Toei Industry Co., Ltd.).

TABLE 3

| | Ferromagnetic powder | Abrasive liquid | | | Filler liquid | | | |
| --- | --- | --- | --- | --- | --- | --- | --- | --- |
| | | A | B | C | D | E | F | G |
| Example 1 | BaFe | 6.0 parts | 2.5 parts | 7.0 parts | 0.1 parts | 1.7 parts | 0.3 parts | 0.0 parts |
| Example 2 | BaFe | 2.0 parts | 2.5 parts | 7.0 parts | 0.1 parts | 1.7 parts | 0.3 parts | 0.0 parts |
| Example 3 | BaFe | 6.0 parts | 2.5 parts | 7.0 parts | 0.0 parts | 1.7 parts | 0.3 parts | 0.0 parts |
| Example 4 | BaFe | 6.0 parts | 0.7 parts | 7.0 parts | 0.1 parts | 0.1 parts | 0.3 parts | 0.0 parts |
| Example 5 | BaFe | 6.0 parts | 2.5 parts | 3.0 parts | 0.0 parts | 0.1 parts | 0.3 parts | 0.0 parts |
| Example 6 | BaFe | 6.0 parts | 0.7 parts | 7.0 parts | 0.1 parts | 0.1 parts | 0.0 parts | 0.0 parts |
| Example 7 | BaFe | 6.0 parts | 0.7 parts | 3.0 parts | 0.1 parts | 1.7 parts | 0.0 parts | 0.0 parts |
| Example 8 | BaFe | 4.0 parts | 1.6 parts | 5.0 parts | 0.1 parts | 1.7 parts | 0.0 parts | 0.0 parts |
| Example 9 | BaFe | 6.0 parts | 2.5 parts | 3.0 parts | 0.0 parts | 0.7 parts | 0.1 parts | 0.0 parts |
| Example 10 | BaFe | 4.0 parts | 1.6 parts | 5.0 parts | 0.0 parts | 0.7 parts | 0.1 parts | 0.0 parts |
| Example 11 | BaFe | 4.0 parts | 0.7 parts | 5.0 parts | 0.0 parts | 0.1 parts | 0.1 parts | 0.0 parts |
| Example 12 | BaFe | 6.0 parts | 1.6 parts | 3.0 parts | 0.0 parts | 0.7 parts | 0.3 parts | 0.0 parts |
| Example 13 | BaFe | 2.0 parts | 2.5 parts | 7.0 parts | 0.0 parts | 0.1 parts | 0.3 parts | 0.0 parts |
| Example 14 | BaFe | 2.0 parts | 0.7 parts | 3.0 parts | 0.1 parts | 1.7 parts | 0.3 parts | 0.0 parts |
| Example 15 | BaFe | 6.0 parts | 2.5 parts | 7.0 parts | 0.0 parts | 0.1 parts | 0.0 parts | 0.0 parts |
| Example 16 | BaFe | 2.0 parts | 0.7 parts | 3.0 parts | 0.1 parts | 0.1 parts | 0.3 parts | 0.0 parts |
| Example 17 | BaFe | 6.0 parts | 0.7 parts | 7.0 parts | 0.0 parts | 0.1 parts | 0.0 parts | 0.0 parts |
| Example 18 | BaFe | 6.0 parts | 0.7 parts | 3.0 parts | 0.1 parts | 0.1 parts | 0.0 parts | 0.0 parts |
| Example 19 | BaFe | 2.0 parts | 0.7 parts | 7.0 parts | 0.0 parts | 0.1 parts | 0.3 parts | 0.0 parts |

TABLE 3-continued

| | Ferromagnetic powder | Abrasive liquid | | | Filler liquid | | | |
|---|---|---|---|---|---|---|---|---|
| | | A | B | C | D | E | F | G |
| Example 20 | BaFe | 2.0 parts | 0.7 parts | 3.0 parts | 0.0 parts | 0.1 parts | 0.0 parts | 0.0 parts |
| Example 21 | SrFe1 | 6.0 parts | 2.5 parts | 7.0 parts | 0.0 parts | 1.7 parts | 0.3 parts | 0.0 parts |
| Example 22 | SrFe2 | 6.0 parts | 2.5 parts | 7.0 parts | 0.0 parts | 1.7 parts | 0.3 parts | 0.0 parts |
| Example 23 | ε-iron oxide | 6.0 parts | 2.5 parts | 7.0 parts | 0.0 parts | 1.7 parts | 0.3 parts | 0.0 parts |
| Comparative Example 1 | BaFe | 1.6 parts | 3.0 parts | 1.0 part | 0.0 parts | 0.0 parts | 0.0 parts | 2.0 parts |
| Comparative Example 2 | BaFe | 4.0 parts | 1.6 parts | 2.0 parts | 0.5 parts | 0.7 parts | 0.1 parts | 0.0 parts |
| Comparative Example 3 | BaFe | 6.4 parts | 1.6 parts | 0.5 parts | 0.5 parts | 0.7 parts | 0.4 parts | 0.0 parts |
| Comparative Example 4 | BaFe | 4.0 parts | 1.6 parts | 5.0 parts | 0.5 parts | 0.7 parts | 0.4 parts | 0.0 parts |
| Comparative Example 5 | BaFe | 6.4 parts | 1.6 parts | 0.5 parts | 0.0 parts | 0.7 parts | 0.6 parts | 0.0 parts |
| Comparative Example 6 | BaFe | 6.4 parts | 1.6 parts | 2.0 parts | 0.0 parts | 0.0 parts | 0.0 parts | 2.4 parts |
| Comparative Example 7 | BaFe | 4.0 parts | 3.0 parts | 2.0 parts | 0.0 parts | 0.0 parts | 0.0 parts | 2.4 parts |
| Comparative Example 8 | BaFe | 4.0 parts | 3.0 parts | 5.0 parts | 0.0 parts | 0.0 parts | 0.0 parts | 2.4 parts |
| Comparative Example 9 | BaFe | 1.6 parts | 1.6 parts | 2.0 parts | 0.0 parts | 0.0 parts | 0.0 parts | 0.8 parts |
| Comparative Example 10 | BaFe | 6.4 parts | 0.5 parts | 2.0 parts | 0.0 parts | 0.0 parts | 0.0 parts | 0.8 parts |
| Comparative Example 11 | BaFe | 6.4 parts | 1.6 parts | 5.0 parts | 0.0 parts | 0.0 parts | 0.0 parts | 0.8 parts |
| Comparative Example 12 | BaFe | 4.0 parts | 0.5 parts | 2.0 parts | 0.0 parts | 0.0 parts | 0.0 parts | 2.4 parts |
| Comparative Example 13 | BaFe | 8.0 parts | 1.6 parts | 5.0 parts | 0.0 parts | 0.7 parts | 0.1 parts | 0.0 parts |
| Comparative Example 14 | BaFe | 4.0 parts | 3.0 parts | 5.0 parts | 0.0 parts | 0.7 parts | 0.1 parts | 0.0 parts |
| Comparative Example 15 | BaFe | 4.0 parts | 1.6 parts | 0.5 parts | 0.0 parts | 0.7 parts | 0.1 parts | 0.0 parts |
| Comparative Example 16 | BaFe | 4.0 parts | 1.6 parts | 5.0 parts | 0.0 parts | 0.0 parts | 0.0 parts | 1.0 part |
| Comparative Example 17 | BaFe | 4.0 parts | 1.6 parts | 5.0 parts | 0.0 parts | 2.3 parts | 0.1 parts | 0.0 parts |
| Comparative Example 18 | BaFe | 4.0 parts | 1.6 parts | 5.0 parts | 0.0 parts | 0.7 parts | 0.6 parts | 0.0 parts |

Evaluation of Magnetic Tape

One roll of the magnetic tape cartridge was extracted from each magnetic tape cartridge group of Examples and Comparative Examples, and physical properties of the magnetic tape accommodated in the extracted magnetic tape cartridge were evaluated by the following method.

Number Distribution A and Number Distribution B

Using an FE-SEM S4800 manufactured by Hitachi, Ltd. as a scanning electron microscope (FE-SEM), the number distribution A and the number distribution B of the magnetic layer surface of each magnetic tape were obtained by the following method.

Number Distribution A

A secondary electron image of the magnetic layer surface of the magnetic recording medium to be measured is captured using a scanning electron microscope (FE-SEM). As imaging conditions, an acceleration voltage is 5 kV, an operating distance is 5 mm, and an imaging magnification is 10,000. In imaging, a non-imaging region on the magnetic layer surface is selected, focus adjustment is performed under the imaging conditions, and a secondary electron image is captured. A part (micron bar, cross mark, or the like) for displaying the size and the like is erased from the captured image, and a secondary electron image having the number of pixels of 960 pixels×1280 pixels is acquired.

The above operation is performed 100 times at different positions on the magnetic layer surface of the magnetic recording medium to be measured.

The secondary electron image thus acquired is taken into image processing software (free software ImageJ), and is binarized by the following procedure.

For a threshold value for binarizing the secondary electron image acquired above, a lower limit is set to 210 gradations and an upper limit is set to 255 gradations, and the binarization processing is executed based on these two threshold values. After the binarization processing, in the image analysis software (free software ImageJ), noise cut processing Despeckle is selected to remove the noise component.

For the binarized image thus obtained, the number of bright regions (that is, white parts) and the area of each bright region are obtained by the image analysis software (free software ImageJ). From the area A of the bright region obtained here, an equivalent circle diameter L of each bright region is calculated by $(A/\pi)^{(1/2)} \times 2 = L$.

The above processes are performed on the binarized image (100 images) obtained above.

From the above, the number distribution A is obtained.

Number Distribution B

A secondary electron image of the magnetic layer surface of the magnetic recording medium to be measured is captured using a scanning electron microscope (FE-SEM). As imaging conditions, an acceleration voltage is 2 kV, an operating distance is 5 mm, and an imaging magnification is 10,000. In imaging, a non-imaging region on the magnetic layer surface is selected, focus adjustment is performed under the imaging conditions, and a secondary electron image is captured. A part (micron bar, cross mark, or the like) for displaying the size and the like is erased from the captured image, and a secondary electron image having the number of pixels of 960 pixels×1280 pixels is acquired.

The above operation is performed 100 times at different positions on the magnetic layer surface of the magnetic recording medium to be measured.

The secondary electron image thus acquired is taken into image processing software (free software ImageJ), and is binarized by the following procedure.

For a threshold value for binarizing the secondary electron image acquired above, a lower limit is set to 0 gradation and an upper limit is set to 75 gradations, and the binarization processing is executed based on these two threshold values. After the binarization processing, in the image analysis software (free software ImageJ), noise cut processing Despeckle is selected to remove the noise component.

For the binarized image thus obtained, the number of dark regions (that is, black parts) and the area of each dark region are obtained by the image analysis software (free software ImageJ). From the area A of the dark region obtained here, an equivalent circle diameter L of each dark region is calculated by $(A/\pi)^{(1/2)} \times 2 = L$.

The above processes are performed on the binarized image (100 images) obtained above.

From the above, the number distribution B is obtained.

Total Thickness of Magnetic Tape (Tape Thickness)

Ten tape samples (5 cm in length) were cut out from any part of the magnetic tape, and these tape samples were stacked to measure the thickness. The thickness was measured using a digital thickness gauge of Millimar 1240 compact amplifier and Millimar 1301 induction probe manufactured by Mahr Inc. A value (thickness per tape sample) obtained by dividing the measured thickness by 1/10 was set as the tape thickness. For each magnetic tape, the tape thickness was 5.3 μm.

Evaluation of Magnetic Tape Cartridge Group

GTT Slope α

A total of 200 rolls of the magnetic tape cartridges were randomly extracted from each magnetic tape cartridge group of Examples and Comparative Examples, and for these magnetic tape cartridges, the GTT slope α was obtained in an environment of an atmosphere temperature of 13° C. and a relative humidity of 15% by the method described above using an LTO8 drive.

Reproduction Quality in GTT

The number of channels means the number of tracks to be reproduced at the same time, and the number of channels in the LTO8 drive is 32 channels. During reproduction, in a case where reproduction failure occurs in some of the tracks to be reproduced at the same time, reproduction error information is displayed on the drive.

In the evaluation of the GTT slope α, in the reproduction of the recorded data in a total of 200 rolls of the magnetic tape cartridges, the evaluation result was set to "A" in a case where the reproduction error information was not displayed (that is, in a case where all the tracks to be reproduced at the same time could be reproduced without occurrence of reproduction failure), and the evaluation result was set to "B" in a case where the reproduction error information was displayed.

Based on the above evaluation standard, the reproduction quality in GTT in an environment of an atmosphere temperature of 13° C. and a relative humidity of 15% was evaluated.

The above results are shown in Table 4 (Table 4-1 and Table 4-2).

TABLE 4

| | Number distribution A | | | Number distribution B | | | GTT slope α (dB/decade) | Reproduction quality in GTT |
|---|---|---|---|---|---|---|---|---|
| | 1 nm or more and 50 nm or less | 51 nm or more and 100 nm or less | 101 nm or more | 1 nm or more and 50 nm or less | 51 nm or more and 100 nm or less | 101 nm or more | | |
| Example 1 | 30000 | 25000 | 7000 | 1000 | 5000 | 200 | 0.3 | A |
| Example 2 | 10000 | 25000 | 7000 | 1000 | 5000 | 200 | 0.2 | A |
| Example 3 | 30000 | 25000 | 7000 | 100 | 5000 | 200 | 0.1 | A |
| Example 4 | 30000 | 7000 | 7000 | 1000 | 200 | 200 | 0.1 | A |
| Example 5 | 30000 | 25000 | 3000 | 100 | 200 | 200 | 0.1 | A |
| Example 6 | 30000 | 7000 | 7000 | 1000 | 200 | 0 | 0.3 | A |
| Example 7 | 30000 | 7000 | 3000 | 1000 | 5000 | 0 | 0.2 | A |
| Example 8 | 20000 | 16000 | 5000 | 1000 | 5000 | 0 | 0.1 | A |
| Example 9 | 30000 | 25000 | 3000 | 600 | 2000 | 100 | 0.1 | A |
| Example 10 | 20000 | 16000 | 5000 | 600 | 2000 | 100 | 0.1 | A |
| Example 11 | 20000 | 7000 | 5000 | 100 | 200 | 100 | 0.1 | A |
| Example 12 | 30000 | 16000 | 3000 | 100 | 2000 | 200 | 0.1 | A |
| Example 13 | 10000 | 25000 | 7000 | 100 | 200 | 200 | 0.2 | A |
| Example 14 | 10000 | 7000 | 3000 | 1000 | 5000 | 200 | 0.3 | A |
| Example 15 | 30000 | 25000 | 7000 | 100 | 200 | 0 | 0.2 | A |
| Example 16 | 10000 | 7000 | 3000 | 1000 | 200 | 200 | 0.1 | A |
| Example 17 | 30000 | 7000 | 7000 | 100 | 200 | 0 | 0.2 | A |
| Example 18 | 30000 | 7000 | 3000 | 1000 | 200 | 0 | 0.1 | A |
| Example 19 | 10000 | 7000 | 7000 | 100 | 200 | 200 | 0.2 | A |
| Example 20 | 10000 | 7000 | 3000 | 100 | 200 | 0 | 0.3 | A |
| Example 21 | 30000 | 25000 | 7000 | 100 | 5000 | 200 | 0.1 | A |
| Example 22 | 30000 | 25000 | 7000 | 100 | 5000 | 200 | 0.1 | A |
| Example 23 | 30000 | 25000 | 7000 | 100 | 5000 | 200 | 0.1 | A |
| Comparative Example 1 | 8000 | 30000 | 1000 | 0 | 7000 | 200 | 0.8 | B |
| Comparative Example 2 | 20000 | 16000 | 2000 | 10000 | 2000 | 100 | 1.1 | B |
| Comparative Example 3 | 32000 | 16000 | 500 | 10000 | 2000 | 280 | 0.9 | B |

TABLE 4-continued

| | Number distribution A | | | Number distribution B | | | GTT slope α (dB/decade) | Reproduction quality in GTT |
|---|---|---|---|---|---|---|---|---|
| | 1 nm or more and 50 nm or less | 51 nm or more and 100 nm or less | 101 nm or more | 1 nm or more and 50 nm or less | 51 nm or more and 100 nm or less | 101 nm or more | | |
| Comparative Example 4 | 20000 | 16000 | 5000 | 10000 | 2000 | 280 | 1.3 | B |
| Comparative Example 5 | 32000 | 16000 | 500 | 600 | 2000 | 450 | 1.6 | B |
| Comparative Example 6 | 32000 | 16000 | 2000 | 0 | 7000 | 240 | 1.0 | B |
| Comparative Example 7 | 20000 | 30000 | 2000 | 0 | 7000 | 240 | 1.9 | B |
| Comparative Example 8 | 20000 | 30000 | 5000 | 0 | 7000 | 240 | 2.0 | B |
| Comparative Example 9 | 8000 | 16000 | 2000 | 0 | 2000 | 80 | 1.8 | B |
| Comparative Example 10 | 32000 | 5000 | 2000 | 0 | 2000 | 80 | 1.5 | B |
| Comparative Example 11 | 32000 | 16000 | 5000 | 0 | 2000 | 80 | 2.8 | B |
| Comparative Example 12 | 20000 | 5000 | 2000 | 0 | 7000 | 240 | 3.0 | B |
| Comparative Example 13 | 40000 | 16000 | 5000 | 600 | 2000 | 100 | 0.8 | B |
| Comparative Example 14 | 20000 | 30000 | 5000 | 600 | 2000 | 100 | 1.0 | B |
| Comparative Example 15 | 20000 | 16000 | 500 | 600 | 2000 | 100 | 1.5 | B |
| Comparative Example 16 | 20000 | 16000 | 5000 | 0 | 2000 | 100 | 1.6 | B |
| Comparative Example 17 | 20000 | 16000 | 5000 | 600 | 7000 | 100 | 0.9 | B |
| Comparative Example 18 | 20000 | 16000 | 5000 | 600 | 2000 | 450 | 1.2 | B |

An aspect of the present invention is useful in the technical field of a magnetic recording medium used as an archive recording medium.

What is claimed is:

1. A magnetic recording medium comprising:
   a non-magnetic support; and
   a magnetic layer including ferromagnetic powder,
   wherein a number distribution A of a plurality of bright regions, based on equivalent circle diameters thereof, in a binarized image of a secondary electron image obtained by imaging a surface of the magnetic layer by a scanning electron microscope at an acceleration voltage of 5 kV satisfies the following (1) to (3):
   (1) bright regions having an equivalent circle diameter of 1 nm or more and 50 nm or less are 10,000 or more and 30,000 or less;
   (2) bright regions having an equivalent circle diameter of 51 nm or more and 100 nm or less are 7,000 or more and 25,000 or less; and
   (3) bright regions having an equivalent circle diameter of 101 nm or more are 3,000 or more and 7,000 or less, and
   a number distribution B of a plurality of dark regions, based on equivalent circle diameters thereof, in a binarized image of a secondary electron image obtained by imaging a surface of the magnetic layer by a scanning electron microscope at an acceleration voltage of 2 kV satisfies the following (4) to (6):
   (4) dark regions having an equivalent circle diameter of 1 nm or more and 50 nm or less are 100 or more and 1,000 or less;
   (5) dark regions having an equivalent circle diameter of 51 nm or more and 100 nm or less are 200 or more and 5,000 or less; and
   (6) dark regions having an equivalent circle diameter of 101 nm or more are 0 or more and 200 or less.

2. The magnetic recording medium according to claim 1, wherein a total thickness of the magnetic recording medium is 5.3 µm or less.

3. The magnetic recording medium according to claim 1, further comprising:
   a non-magnetic layer including non-magnetic powder between the non-magnetic support and the magnetic layer.

4. The magnetic recording medium according to claim 1, further comprising:
   a back coating layer including non-magnetic powder on a surface side of the non-magnetic support opposite to a surface side provided with the magnetic layer.

5. The magnetic recording medium according to claim 1, wherein the magnetic layer includes two or more types of non-magnetic powder.

6. The magnetic recording medium according to claim 5, wherein the non-magnetic powder of the magnetic layer includes alumina powder.

7. The magnetic recording medium according to claim 5, wherein the non-magnetic powder of the magnetic layer includes carbon black.

8. The magnetic recording medium according to claim 1, wherein the ferromagnetic powder is hexagonal barium ferrite powder.

9. The magnetic recording medium according to claim 1, wherein the ferromagnetic powder is hexagonal strontium ferrite powder.

10. The magnetic recording medium according to claim 1, wherein the ferromagnetic powder is ε-iron oxide powder.

11. The magnetic recording medium according to claim 1, wherein the magnetic recording medium is a magnetic tape.

12. A magnetic recording and reproducing apparatus comprising:
the magnetic recording medium according to claim 1.

13. A magnetic tape cartridge comprising:
the magnetic recording medium according to claim 11.

14. A magnetic tape cartridge group comprising:
a plurality of the magnetic tape cartridges according to claim 13.

15. The magnetic tape cartridge group according to claim 14,
wherein, in an environment of an atmosphere temperature of 13° C. and a relative humidity of 15%, a slope $\alpha$ of a signal-to-noise-ratio with respect to the number of rolls, the slope $\alpha$ being obtained by performing a reproduction test of a total of 200 rolls of the magnetic tape cartridges using a single magnetic head, is 0.5 dB/decade or less.

* * * * *